United States Patent [19]
Trompower et al.

[11] Patent Number: 6,138,019
[45] Date of Patent: Oct. 24, 2000

[54] CELLULAR SYSTEM HAND-OFF PROTOCOL

[75] Inventors: Michael L. Trompower, Navarre, Ohio; Douglas A. Smith, Pickering, Canada; Philip H. Belanger, Akron, Ohio; Andrew J. Spry, Wichita, Kans.; Nainesh P. Shah, Strongsville, Ohio

[73] Assignee: Cisco Systems, Inc., San Jose, Calif.

[21] Appl. No.: 08/763,420

[22] Filed: Dec. 11, 1996

Related U.S. Application Data

[63] Continuation-in-part of application No. 08/672,751, Jun. 28, 1996.

[51] Int. Cl.[7] .................................................. H04Q 7/20
[52] U.S. Cl. ........................................ 455/436; 455/432
[58] Field of Search .................................. 455/436, 422, 455/438, 439, 432, 434, 515; 370/330, 331; 375/202

[56] References Cited

U.S. PATENT DOCUMENTS

| | | | |
|---|---|---|---|
| 4,554,668 | 11/1985 | Deman et al. ........................... | 375/107 |
| 5,123,029 | 6/1992 | Bantz et al. ............................. | 375/1 |
| 5,287,384 | 2/1994 | Avery et al. . | |
| 5,317,623 | 5/1994 | Sakamoto et al. . | |
| 5,325,419 | 6/1994 | Connolly et al. . | |
| 5,329,531 | 7/1994 | Diepstraten et al. ................... | 370/347 |
| 5,386,435 | 1/1995 | Cooper et al. .......................... | 375/200 |
| 5,425,049 | 6/1995 | Dent et al. .............................. | 375/202 |
| 5,446,769 | 8/1995 | Shaver et al. . | |
| 5,519,706 | 5/1996 | Bantz et al. ........................... | 370/85.3 |
| 5,574,979 | 11/1996 | West ....................................... | 455/63 |
| 5,619,493 | 4/1997 | Ritz et al. .............................. | 370/330 |
| 5,655,217 | 8/1997 | Lemson et al. ........................ | 455/513 |
| 5,737,358 | 4/1998 | Ritz et al. .............................. | 375/202 |
| 5,748,669 | 5/1998 | Yada ....................................... | 375/202 |
| 5,771,353 | 6/1998 | Eggelston et al. ................. | 395/200.59 |
| 5,794,145 | 8/1998 | Milan ...................................... | 455/426 |
| 5,848,064 | 12/1998 | Cowan ................................... | 370/338 |
| 5,862,142 | 1/1999 | Takiyasu et al. ...................... | 370/480 |

FOREIGN PATENT DOCUMENTS

589552A2   7/1993   European Pat. Off. .

OTHER PUBLICATIONS

IPCCC '92, pp. 0255–0259, "A Hybrid Indoor Data Network with Radio and Wire Performance Evaluation in a Rayleigh Channel" by Kaname Arai, Hiroshi Shigeno, Teruo Yokoyama, Yutaka Matsushita.

*Primary Examiner*—Fan Tsang
*Assistant Examiner*—Congvan Tran
*Attorney, Agent, or Firm*—Arter & Hadden LLP

[57] ABSTRACT

A cellular communication system hand-off protocol which helps minimize down time associated with a mobile device roaming among different cells in which different cells employ different communication channels (e.g., different frequency hopping sequences). In a preferred embodiment, each base station is configured to communicate its own particular hopping sequence to the host computer via the system backbone. Each base station then provides to mobile devices which are registered thereto information regarding the particular hopping sequences employed by other base stations servicing cells into which the mobile device may roam. Such information includes the particular hopping sequences together with an indication of what location in the sequence the base stations are currently at in any given time. In addition, such information may include an indication of the intervals at which a base station is configured to transmit a beacon packet (for passive scanning operation), or at what intervals test pattern packets are transmitted to allow for signal quality evaluation.

6 Claims, 20 Drawing Sheets

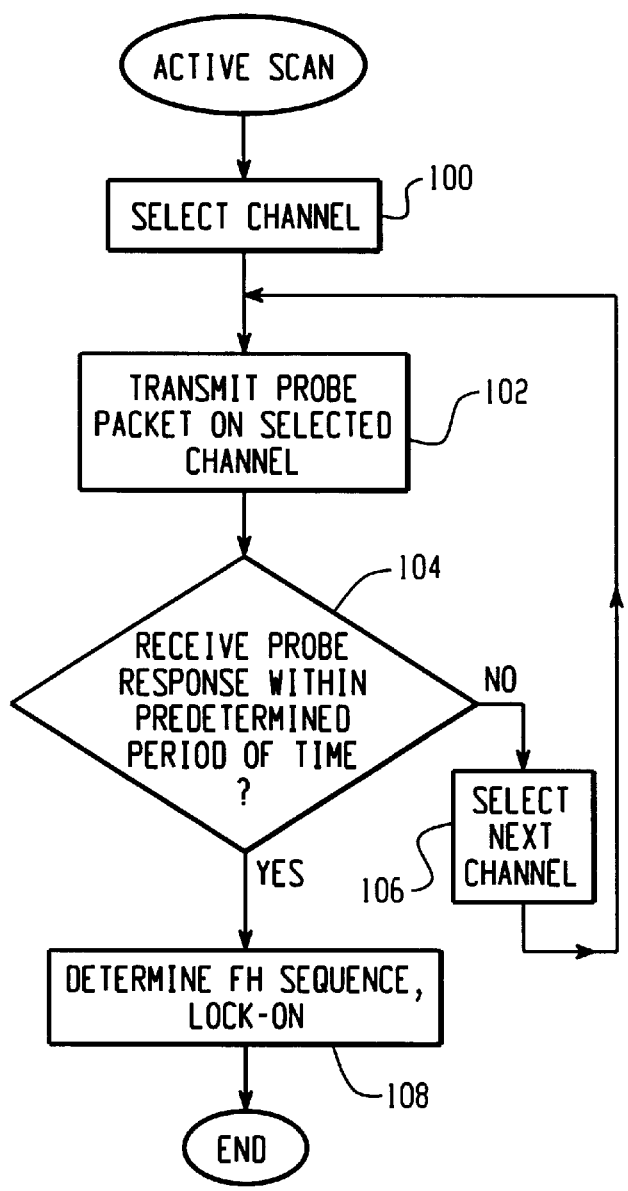
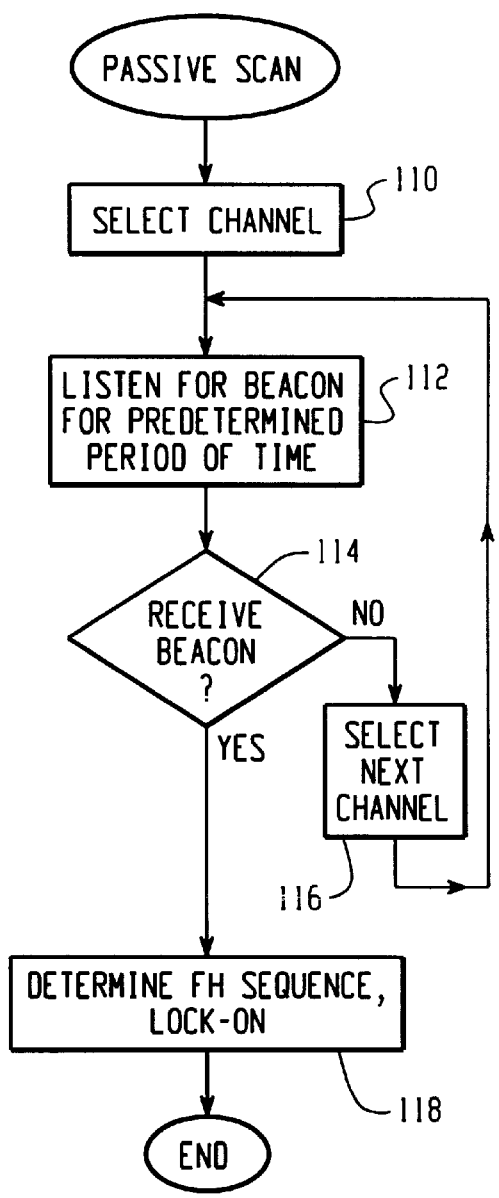
Fig. 1
Fig. 2

TIME DELAY TABLE

| TEST PACKET NO. (i) | TRANSMIT TIME | RECEIPT TIME | BASE STATION RECEIPT TIME | BASE STATION TRANSMIT TIME | TIME DELAY (tdelay) ($\mu$sec) |
|---|---|---|---|---|---|
| i = 1 | | | | | |
| i = 2 | | | | | |
| i = 3 | | | | | |
| | | | | | |

*Fig. 12E*

BASE STATION HOPPING SEQUENCE TABLE

| BASE STATION ID | SEQUENCE INFO SET #, PATTERN # | BASE STATION START TIME | BEACON INTERVAL | TEST PATTERN INTERVAL |
|---|---|---|---|---|
| | | | | |
| | | | | |
| | | | | |
| | | | | |
| | | | | |
| | | | | |

*Fig. 12F*

CELLULAR SYSTEM HAND-OFF PROTOCOL

REFERENCES TO RELATED APPLICATIONS

This is a continuation-in-part of copending U.S. application Ser. No. 08/672,751, filed Jun. 28, 1996, the entire disclosure of which is incorporated by reference.

TECHNICAL FIELD

The present invention relates generally to a cellular communication system, and more particularly to a hand-off protocol between cells in a cellular communication system.

BACKGROUND OF THE INVENTION

In recent years, the use of cellular communication systems having mobile devices which communicate with a hardwired network, such as a local area network (LAN) or a wide area network (WAN), has become widespread. Retail stores and warehouses, for example, may use cellular communication systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographic regions while retaining telephonic access. Paging networks also may utilize cellular communication systems which enable a user carrying a pocket sized pager to be paged anywhere within a geographic region.

A typical cellular communication system includes a number of fixed base stations interconnected by a cable medium often referred to as a system backbone. Also included in many cellular communication systems are intermediate base stations which are not directly connected to the system backbone but otherwise perform many of the same functions as the fixed base stations. Intermediate base stations, often referred to as wireless base stations, increase the area within which base stations connected to the system backbone can communicate with mobile devices. Unless otherwise indicated, the term "base station" will hereinafter refer to both base stations hardwired to the system backbone and wireless base stations.

Associated with each base station is a geographic cell. Such cell is a geographic area in which a base station has sufficient signal strength to transmit data to and receive data from a mobile device such as a data terminal or telephone with an acceptable error rate. Typically, base stations will be positioned along the backbone such that the combined cell area coverage from each base station provides full coverage of a building or site.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and a base station to which the mobile device is registered. As the mobile device roams from one cell to another, the mobile device will typically deregister with the base station of the previous cell and register with the base station associated with the new cell.

Cellular communication systems such as those described above often involve spread spectrum (SS) technology. An SS communication system is one in which the transmitted frequency spectrum or bandwidth is much wider than absolutely necessary. Generally, SS technology is utilized for communications in the unlicensed bands provided by the FCC for low power communication devices. These bands include the 902–928 MHZ and 2.4–2.48 GHz ranges in the U.S., although SS communication may occur in any allowable range. The FCC requires that information transmitted in these bands be spread and coded in order to allow multiple user access to these bands at the same time.

One type of SS communication system is known as a frequency hopping spread spectrum (FHSS) system. The coding scheme for a FHSS system utilizes a pseudo-random hopping sequence whereby information is sent using a sequence of carrier frequencies that change at intervals to produce a narrow band signal that "hops" around in center frequency over the available spectrum. Only transmitters and receivers hopping on the same sequence are capable of sustained communication with one another. Thus, multiple systems can share the same bandwidths without significant interference by selecting different pseudo-random hopping sequences with which to communicate.

The FCC provides rules governing the use of FHSS systems. For example, if communicating in the 2.4–2.48 GHz unlicensed band, the FCC provides that FHSS systems must have at least 75 hopping frequencies, or channels, separated by at least 25 Khz, and the average time of occupancy (or "dwell time") on any given channel must not be greater than 0.4 seconds in any 30 second period. This means that a maximum possible dwell time on any given channel is 400 milliseconds (msec), and typically will be about 100 msec.

In a FHSS system, each base station is typically required to communicate using a different hopping sequence including different channels and/or a different order of channels. Therefore, in order for a mobile device to roam from cell to cell, it must be able to "lock-on" to each new hopping sequence it encounters. In conventional systems, mobile devices typically use either an active or passive scanning mode to lock-on to a new hopping sequence associated with a new base station to which it wishes to register upon loss of communications with the base station to which it had been registered. Unfortunately, there have been several drawbacks associated with conventional active or passive scanning as will now be discussed.

FIG. 1 represents the sequence of operations involved in a typical active scanning mode. If operating in the active scanning mode, a mobile device initially selects a channel and sends out a probe packet to determine whether any base station within range is currently communicating on that channel. The mobile terminal then waits for a predetermined period of time during which a probe response packet should be received from the base station on that channel provided a base station is currently on the channel. More specifically, in step 100 the mobile device sets its transmitter and receiver to operate on a selected one of the possible hopping frequencies or channels within the system. Next, in step 102 the mobile device transmits a probe packet on the selected channel. The probe packet indicates to any base station within range and communicating on the same channel that the mobile device would like information regarding the particular hopping sequence employed by the receiving base station.

In step 104, the mobile device determines if a probe response packet has been received by the mobile device within a predetermined period of time (e.g., 6 msec) following the transmission of the probe packet. If no probe response packet is received in step 104, the mobile device selects another possible hopping channel within the system and sets its receiver and transmitter to operate on the newly selected channel as represented in step 106. Following step 106, the mobile device returns to step 102 and transmits a probe packet on the newly selected channel. Steps 102, 104 and 106 are repeated until the mobile device receives a probe response packet and is able to lock-on to a new hopping sequence. More specifically, when a probe response is received in step 104, the mobile device proceeds to step 108 in which the hopping sequence of the base station is determined based on the contents of the probe response packet. Timing information included in the probe response packet allows the mobile device to then lock-on to the hopping sequence. Typically, the amount of time the mobile device remains on any one channel while actively scanning is short compared to the amount of time a base station dwells on a given channel. Therefore, the mobile terminal can scan through each possible channel and will ultimately receive a probe response, albeit after some time delay. Depending on where a base station is in its hopping sequence and the order in which the mobile device selects different channels on which to transmit a probe packet, the mobile device may have to cycle through all of the possible hopping channels (e.g., all 75 or more channels) numerous times before hitting on the same channel that a base station within range is currently on in its hopping sequence. Thus, a time delay may exist anywhere between zero to ten seconds, for example, before the mobile device determines the hopping sequence of a new base station with which to register.

In a passive scanning mode, a mobile device does not send out probe packets to determine whether a base station is currently on the same channel. Rather, the base stations are configured to periodically transmit beacon packets indicating the particular hopping sequence utilized by the base station. Each mobile device simply stays on a given one of the possible hopping channels and waits to receive a beacon packet from a base station. The beacon packet provides the mobile device with hopping sequence and timing information which allows the mobile device to lock-on to the new hopping sequence.

FIG. 2 represents another passive scanning mode technique in which a mobile device periodically hops from channel to channel waiting to receive a beacon packet. For example, in step 110 the mobile device sets its receiver to operate on a selected one of the possible hopping channels. Next, in step 112 the mobile device stays on the selected channel and waits a predetermined period of time (e.g., 10 msec) to receive a beacon packet on the selected channel. In step 114 the mobile device determines if a beacon packet was received. If no, the mobile device proceeds to step 116 in which the mobile device selects another hopping channel and sets its receiver to operate on the newly selected channel. Thereafter, the mobile device returns to step 112 and again waits a predetermined time to receive a beacon packet. Steps 112, 114 and 116 are repeated until such time as a beacon packet is received as determined in step 114. At that time, the mobile device proceeds to step 118 in which the mobile device locks on to the hopping sequence of the base station transmitting the beacon packet based on the information provided in the beacon packet.

Therefore, by remaining on one channel or by sequencing through the various hopping channels waiting to receive a beacon packet, the mobile device will eventually receive a beacon packet. However, as with the active scanning mode there will be an indefinite time delay before a beacon packet is received and the mobile device is able to lock-on to the hopping sequence of another base station. Such time delay could be, for example, anywhere from zero to ten seconds.

Unfortunately, during those times that a mobile device is not registered to a base station or is otherwise attempting to register with a new base station, no communication can occur between the mobile device and devices situated on the system backbone. As a result, users often experience down time where it appears that their mobile device has locked up so as not to permit communications. This can be both frustrating to the user and detrimental to the overall system performance. Similar situations may also occur in other systems having base stations each communicating on different communication channels as produced by using different modulation types or PN codes, for example.

In view of the aforementioned shortcomings associated with conventional cellular systems, there is a strong need in the art for a system and method which help minimize the delay times associated with mobile devices locking on to new hopping sequences or other communication channels when roaming from one cell to another, or searching for a different communication channel in the same cell area. Moreover, there is a strong need in the art for improved active and passive scanning techniques which further reduce conventional delay times.

SUMMARY OF THE INVENTION

The present invention involves a cellular communication system hand-off protocol which helps minimize down time associated with a mobile device roaming among different cells in which different cells employ different communication channels (e.g., different frequency hopping sequences). In a preferred embodiment, each base station is configured to communicate its own particular hopping sequence to a host computer on the system backbone. The host computer maintains a base station hopping sequence table which includes the particular hopping sequences used by the respective base stations, together with a time stamp referenced to a universal clock which indicates exactly when each base station began its hopping sequence relative to the universal clock. The host computer provides the information to each base station which registers in the system. Each base station then provides to mobile devices which are registered thereto information regarding the particular hopping sequences employed by other base stations servicing cells into which the mobile device may roam. Such information includes the particular hopping sequences together with an indication of what position in the sequence the base stations are at currently at any given time. In addition, such information may include an indication of the times at which a base station is configured to transmit a beacon packet (for passive scanning operation), or at what intervals test pattern packets are transmitted to allow for signal quality evaluation.

Accordingly, a mobile device searching for another base station can immediately jump to a channel where a base station is expected to be. Using either an active or passive scanning mode, the mobile device can then transmit a probe packet or wait to receive a beacon packet. Since the mobile device effectively knows where in the hopping sequence a base station currently is, substantial time is saved as compared to conventional techniques which required the mobile device to search essentially randomly through the possible channels. In order to account for time delays and/or slight timing offsets within the system, the mobile devices are configured to scan one or more channels before/ahead of the expected channel.

Mobile devices which roam from one cell to another provide the new base station with updated hopping sequence information of the previous base station. Thus, the base stations are able to maintain updated information regarding the particular hopping sequence and timing of the other base stations. By passing along hopping sequence information of other base stations to a mobile device, the mobile device will ordinarily spend only a very short time searching for the hopping sequence of an alternate base station, thereby minimizing device down time otherwise associated with roaming. In addition, the information will also allow base stations to select channel parameters which are distinct from any other base station communicating within the same cell area. Furthermore, the present invention presents improved active and passive scanning methods which further enhance system performance.

According to one aspect of the invention, in a cellular communication system comprising a backbone, a host device coupled to said backbone, and a first base station and a second base station each coupled to said backbone, each of said base stations communicating on a selected one of a plurality of communication channels, a method is provided comprising the steps of said second base station conveying to said first base station by way of said host device information related to said communication channel of said second base station; and said first base station receiving said information.

According to another aspect of the invention, in a cellular communication system comprising a backbone, a host device coupled to said backbone, and a plurality of base stations each coupled to said backbone, each of said base stations communicating on a selected one of a plurality of communication channels, a method of informing a mobile device registered to a first of said plurality of base stations of communication channel information related to a second of said plurality of base stations, a method is provided comprising the steps of: said second base station conveying to said first base station by way of said host device information related to said communication channel of said second base station; said first base station receiving said information; and said first base station transmitting at least a portion of said information to said mobile device.

In accordance with yet another aspect of the invention, a cellular communication system is provided, comprising: a backbone and a host device coupled to said backbone; a plurality of base stations each coupled to said backbone, each of said base stations communicating on one of a plurality of different communication channels; at least one mobile device, each of said mobile devices communicating with said backbone via a selected one of said plurality of base stations, each of said base stations including: wireless communication means for communicating information between said backbone and any of said at least one mobile devices which are registered to said base station; means for conveying communication channel information to other of said plurality of base stations in said cellular communication system via said host device; means for receiving communication channel information from said other base stations via said host device; and means for wirelessly transmitting at least a portion of said communication channel information received to mobile devices currently registered to said base station.

According to still another aspect, a base station for use in a cellular communication system is provided, comprising said base station along with at least one similar base station each which are coupled to a backbone as is a host device, with each of said base stations potentially serving as a respective wireless communication link between said backbone and at least one mobile device registered thereto, said base station comprising: wireless communication means for communicating information between said backbone and any of said at least one mobile devices which are registered to said base station; means for conveying communication channel information to other of said at least one similar base station in said cellular communication system by way of said host device; means for receiving communication channel information from said other similar base stations by way of said host device; and means for wirelessly transmitting at least a portion of said communication channel information received to mobile devices currently registered to said base station.

According to still another aspect, a mobile device for use in a cellular communication system is provided, said cellular communication system comprising a backbone and a plurality of base stations coupled thereto, said mobile device capable of communicating with said backbone via one of said plurality of base stations to which the mobile device is currently registered, said mobile device comprising: wireless communication means for communicating information between said mobile device and said backbone; means for receiving a universal clock time based on a universal time keeper within the system hop sequence information related to other of said base stations from said one base station; means for storing said universal clock time and said hop sequence information; means for computing a communication channel at which at least one of said other base stations is expected to be based on said universal clock time and said hop sequence information; and means for jumping directly to the communication channel.

In accordance with another aspect, in a cellular communication system comprising a backbone, and a plurality of base stations each coupled to said backbone, each of said base stations communicating on a selected one of a plurality of communication channels, a method is provided comprising the steps of: conveying from said second base station to said first base station information related to said second base station's hopping sequence; receiving said information by said first base station; storing said information in memory associated with said first base station; computing within said first base station a communication channel upon which said second base station is expected to be based on said information stored in said first base station; transmitting from said first base station to a registered mobile device said communication channel computed; and receiving said communication channel computed by said mobile device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a flowchart describing an active scanning mode operation for locking on to a hopping sequence of a new base station;

FIG. 2 is a flowchart describing passive-scanning mode operation for locking on to a hopping sequence of a new base station;

FIG. 12E represents the contents of a time delay table maintained by the host computer as part of determining the time delay;

FIG. 12F represents the contents of a base station hopping sequence table stored in the host computer in accordance with the present invention;

DESCRIPTION OF THE PREFERRED EMBODIMENTS

Figure 3:
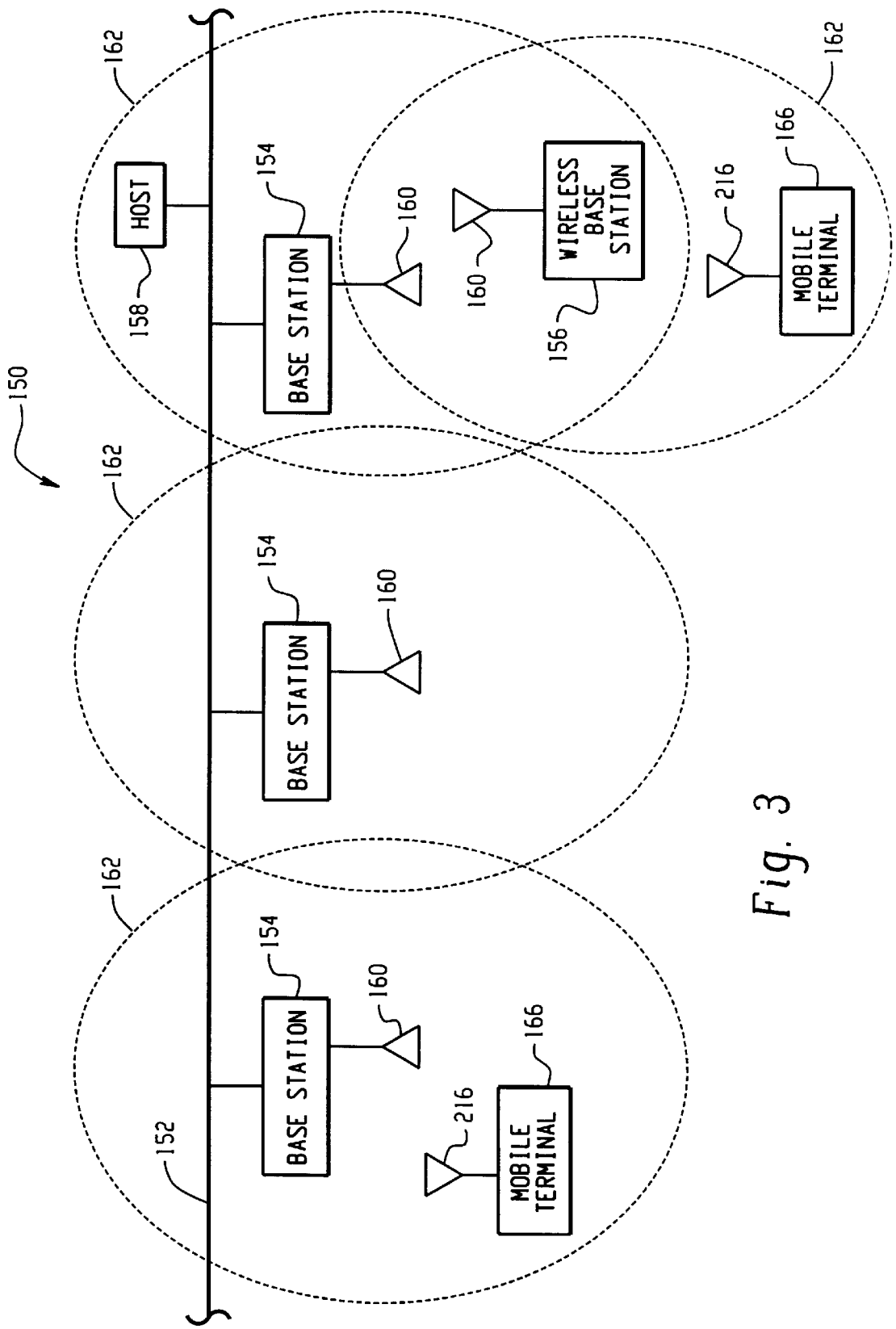
FIG. 3 is a schematic diagram of a cellular communication system in accordance with an example of the present invention.

The present invention will now be described with reference to the drawings wherein like reference numerals are used to refer to like elements throughout. As mentioned above, the present invention relates to cellular communication systems which include mobile devices that can roam from cell to cell. Such mobile devices can be data terminals, telephones, pagers, etc. In the exemplary embodiment described hereinafter, the mobile device is a mobile data terminal (hereinafter "mobile terminal") used to communicate data such as inventory or the like. However, it is recognized that the invention contemplates other types of mobile devices and is not intended to be limited to systems utilizing mobile terminals.

Referring now to FIG. 3, a cellular communication system 150 is shown in accordance with the exemplary embodiment of the present invention. The cellular communication system 150 includes a network having a backbone 152. The backbone 152 may be a hardwired data communication path made of twisted pair cable, shielded coaxial cable or fiber optic cable, for example, or may be wireless in nature. Connected to the system backbone 152 are several base stations 154. Each base station 154 serves as an entrance point through which wireless communications may occur with the system backbone 152. Additionally, in order to expand the effective communication range of the base stations 154, one or more wireless base stations 156 are also included in the cellular communication system 150. As is conventional, each wireless base station 156 associates itself, typically by registration, with another base station, whether hardwired or wireless, such that a link is formed between itself and other devices situated on the system backbone 152. For example, in the system 150 shown in FIG. 3 a wireless base station 156 associates itself with one of the base stations 154 connected to the system backbone 152 so that a communication link is formed between the wireless base station 156 and a host computer 158 coupled to the system backbone 152. All communications between the wireless base station 156 and a device on the system backbone 152 are made possible by the other base stations on the link which are configured to relay communications therebetween.

Each base station 154, 156 is capable of wirelessly communicating with other devices in the system 150 via an antenna 160. A geographic cell 162 associated with each base station 154, 156 defines a region of coverage in which successful wireless communication may occur. Depending on the type of antenna 160 selected and output power of the respective base station, the cell 162 may take one of several different forms and sizes. For example, FIG. 3 depicts the base stations 154, 156 utilizing an omni-directional antenna wherein a generally spherical cell area of coverage is obtained. However, a directed yagi-type antenna or other form of antenna could also be used as will be readily appreciated.

The cellular communication system 150 also includes one or more mobile terminals 166. Each mobile terminal 166 communicates with devices on the system backbone 152 via a selected base station 154, 156 and/or with other mobile terminals 166. Upon roaming from one cell 162 to another, the mobile terminal 166 is configured to associate itself with a new base station 154, 156. As discussed above in the background section, in systems where each base station 154 communicates using a different frequency hopping sequence, there can be delay times associated with the mobile terminal 166 roaming from one base station 154 to another base station 154. In a conventional system, such delay times stem from the time it takes the mobile terminal 166 to lock on to the hopping sequence of a new base station 154.

According to the present invention, however, such delay time is reduced substantially by providing a system in which each of the base stations 154, communicates its own particular hopping sequence to the other base stations 154, 156 via host computer 158 coupled to the system backbone 152. The wireless base stations 156 are configured to adopt the hopping sequence of the base station 154 with which they are associated as discussed more fully below. Each of the base stations 154, 156 maintains in memory information in the form of a roaming table which includes hopping sequence and timing information relating to the other base stations 154, 156. Each mobile terminal 166 which registers with a base station 154, 156 receives therefrom information in the form of a reduced roaming table. The reduced roaming table is stored in memory within the mobile terminal 166 and, as described below, includes hopping sequence and timing information for the base stations 154, 156 which are adjacent to, or have overlapping cell area coverage with the base station with which the mobile terminal 166 is currently registered.

As is described more fully below, in the event a mobile terminal 166 begins to roam from one cell 162 to another, the mobile terminal 166 will look to the information in its reduced roaming table to determine the hopping sequences of the base stations 154, 156 which cover the cell 162 into which the mobile terminal 166 is likely to roam. Based on the hopping sequence and timing information, the mobile terminal 166 can jump immediately to the channel which the base stations 154, 156 are likely to be at and attempt to lock on using either passive or active scanning techniques. In this manner, the mobile terminal 166 can avoid the necessity of scanning through several different channels essentially at random before receiving a beacon or probe response packet allowing the mobile terminal 166 to lock on. Thus, the present invention significantly reduces the search time ordinarily associated with known active or passive modes of scanning as will be further appreciated based on the detailed description below.

Figure 4:
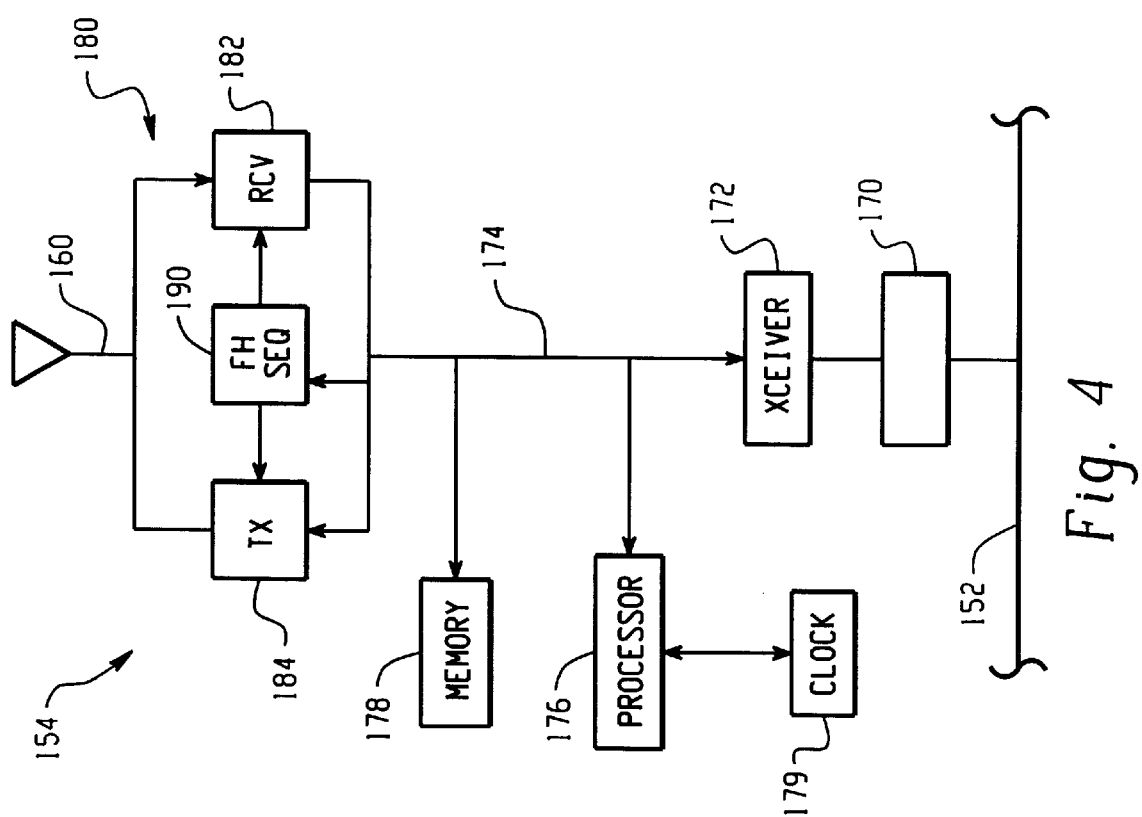
FIG. 4 is a block diagram of a base station in accordance with the present invention.

FIG. 4 is a block diagram representative of each base station 154. Each base station 154 is connected to the system backbone 152 via a connector 170 such as a DB-9 or RJ-45 connector. The connector 170 is connected to the system backbone 152 at one end and to a network adapter transceiver 172 included in the base station 154 at the other end. The network adapter transceiver 172 is configured according to conventional network adapter transceiver techniques to allow the base station 154 to communicate over the system backbone 152. The network adapter transceiver 172 is also connected to an internal bus 174 included within the base station 154. The base station 154 further includes a processor 176 connected to the bus 174 for controlling and carrying out the operations of the base station 154. The processor 176 may include any of a variety of different microprocessors, such as the Motorola 68360 or Intel 80386 microprocessors.

The base station 154 also includes a memory 178 connected to the bus 174. The memory 178 stores program code executed by the processor 176 for controlling the other elements within the base station 154 to carry out the functions described herein. It will be readily apparent to a person having ordinary skill in the art of microprocessor programming how to program the processor 176 and the other elements within the base station 154 to carry out the operations described herein using conventional programming techniques based on the flowcharts and descriptions provided herein. As a result, additional detail as to the specific program code has been omitted. The memory 178 also serves to buffer packets of information such as those received over the system backbone 152 or those transmitted to or received from the mobile terminals 166 or wireless base stations 156. Moreover, the memory 178 functions to store the aforementioned roaming table which is maintained by the processor 176. The roaming table is discussed in more detail below in connection with FIG. 10. The memory 178 also functions to store a frequency hopping sequence table as described below in connection with FIG. 7, such table containing a list of all of the possible frequency hopping sequences which the devices within the system 150 are able to utilize.

Included in the base station 154 is a programmable clock 179 which is used to keep track of the universal time within the system 150 as is described more fully below. In the preferred embodiment, the clock 179 is made up of a 64-bit counter which is incremented once every microsecond. The clock 179 is set to a universal time maintained within the system 150 by the host computer 158 when the base station initially enters the system as discussed below in relation to FIGS. 12A–12D. Thereafter, the clock 179 continuously keeps track of the universal time in synchronization with a universal time maintained in the host computer 158. The clock 179 provides its output of the processor 176.

As will be appreciated based on the detailed description below, the universal time is maintained throughout the system 150 by the base stations 154, 156, the host computer 158, and the mobile terminals 166. The universal time provides a common reference to which the base stations and mobile terminals can relate the various hopping sequences employed by other base stations. By knowing where a base station is in its hopping sequence relative to a universal time clock, a mobile terminal can easily synchronize itself to the particular hopping sequence of the base station.

Also connected to the bus 174 is a radio frequency (RF) section 180 included in the base station 154. The RF section 180 includes the aforementioned antenna 160 for receiving radio signals from and transmitting radio signals to mobile terminals 166 and wireless base stations 156 within the cell area 162 of the base station 154. Information transmitted from a mobile terminal 166 or a wireless base station 156 is received via the antenna 160 and is processed by an RF receiver 182 which demodulates and decodes the signal and converts the information to a digital signal having a packet format as discussed below in connection with FIG. 8. The processor 176 in the base station 154 inserts source routing information into the source routing field of the packet received from the mobile unit, if needed. Thereafter, the processor 176 stores the packet in the memory 178 until such time as the base station 154 transmits the information packet onto the system backbone 152 via the network adapter transceiver 172 and connector 170 or to another device in the system 150 via antenna 160.

Information packets which are transmitted to the base station 154 via the system backbone 152 for transmission to a mobile terminal 166 or wireless base station 156 are received by the backbone network adapter transceiver 172. The processor 176 controls an RF transmitter 184 included in the RF section 180, the RF transmitter 184 also being connected to the bus 174. The processor 176 causes the RF transmitter 184 to modulate and transmit an RF signal which in turn carries the information packet to the appropriate mobile terminal 166 or wireless base station 156.

The RF section 180 includes a frequency hopping (FH) modulating circuit 190 which controllably provides the hopping sequence employed by the RF transmitter 184 and RF receiver 182 for transmitting and receiving signals, respectively. The RF transmitter 184, RF receiver 182 and FH modulating circuit 190 are conventional in design and in the manner in which the transmitter and receiver hop through a sequence of carrier signal frequencies as controlled by the FH modulating circuit 190. Hopping sequence information is provided to the FH modulating circuit 190 from the processor 176 via the bus 174. The FH modulating circuit 190 is controllable in the sense that the FH modulating circuit 190 receives hopping sequence information from the processor 176 and provides output signals to the RF receiver 182 and RF transmitter 184 which determine the sequence of carrier frequencies thereof as the receiver and transmitter each hop through the sequence of channels.

Figure 5:
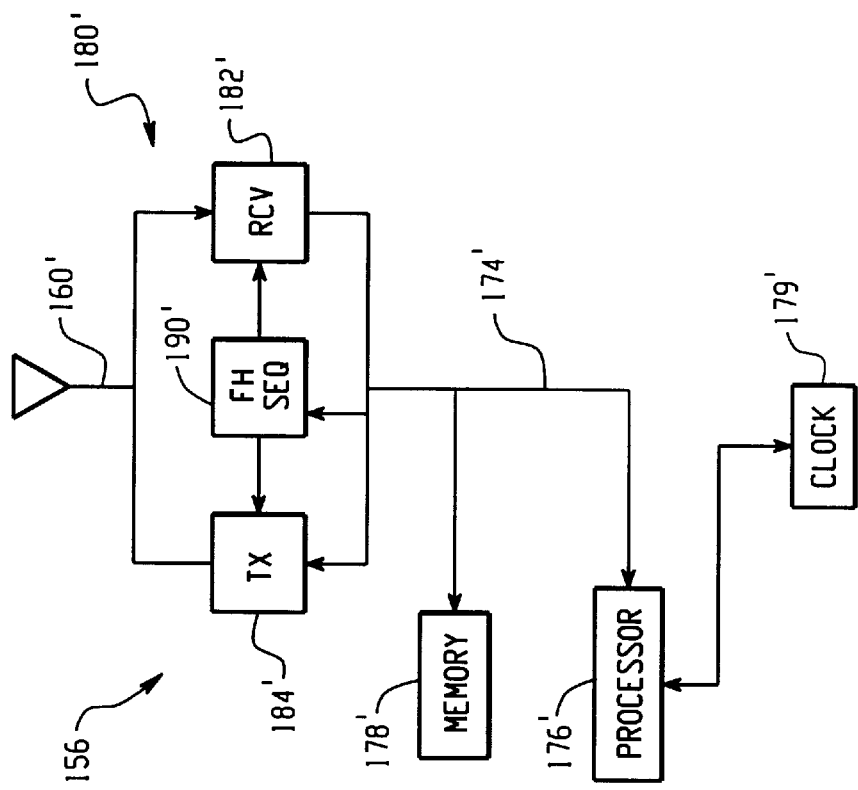
FIG. 5 is a block diagram of a wireless base station in accordance with the present invention.

FIG. 5 is a block diagram representative of each wireless base station 156 in the system 150. For the most part, the construction and operation of the components within the wireless base station 156 are identical to that described with respect to the base stations 154. Hence, similar components are denoted simply by the addition of a "'". For example, the processor 176 in the base station 154 is equivalent to the processor 176' in the wireless base station 156. However, the wireless base station 156 is not connected directly to the system backbone 152 and therefore does not include a network adapter transceiver 172 or connector 170 as in each base station 154. Rather, the wireless base station 156 communicates with mobile terminals 166 registered thereto and with the particular base station with which the wireless base station 156 is associated with via the RF section 180'. Operations of the two base stations 154 and 156 are primarily the same with the exception of the particular procedures described herein. As will be appreciated, the wireless base stations 156 function to extend the relative cell coverage of a given base station 154, and serve primarily to relay information between the base stations 154 connected to the system backbone 152 and the mobile terminals 166. The wireless base station 156 simply adopts the particular hopping sequence of the base station 154 to which it is registered in much the same manner as a mobile terminal 166 as described herein.

Figure 6:
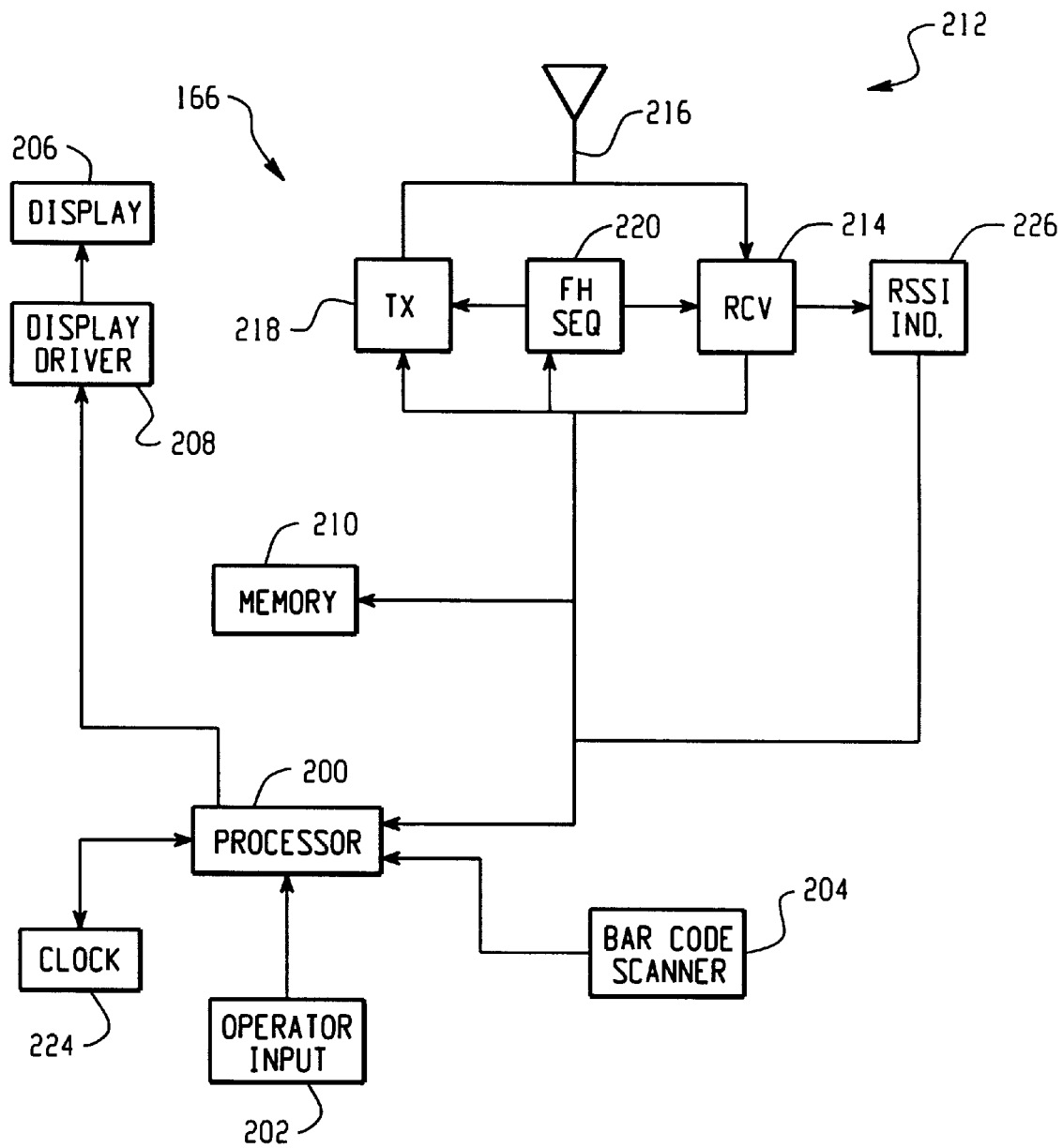
FIG. 6 is a block diagram of a mobile device in the form of a mobile terminal in accordance with the present invention.

FIG. 6 is a block diagram representing the basic structure of each mobile terminal 166 according to the exemplary embodiment. Each mobile terminal 166 includes a processor 200 which can be programmed to control and to operate the various components within the mobile terminal 166 in order to carry out the various functions described herein. The processor 200 has coupled thereto an operator input device 202 which allows an operator to input data to be communicated to the system backbone 152 such as inventory data, patient information, etc. This information may be sent to the host computer 158 which serves as a central data location, for example, or to a cash register connected to the system backbone 152, as another example, for providing price information. The input device 202 can include such items as a keypad, touch sensitive display, etc. The mobile terminal 166 also may include a bar code scanner 204 coupled to the processor 200 serving as another form of data input. A display 206 is connected to and controlled by the processor 200 via a display driver circuit 208. The display 206 serves as a means for displaying information stored within the mobile terminal 166 and/or received over the system backbone 152 via a base station 154, 156. The display 206 can be a flat panel liquid crystal display with alphanumeric capabilities, for example, or any other type of display as will be appreciated.

A memory 210 is included in each mobile terminal 106 for storing program code executed by the processor 170 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 210 also serves as a storage medium for storing information packets received from or intended to be transmitted to a base station 154, 156 as discussed herein.

Furthermore, the memory 210 stores a reduced roaming table which is generated based on information provided by the base station 154, 156 with which the mobile terminal 166 is registered. As discussed below with respect to FIG. 11, the reduced roaming table is maintained by the processor 200 in memory 210 and includes information regarding the particular hopping sequence and timing of the base stations 154, 156 likely to be in the vicinity of the mobile terminal 166. The memory 210 also functions to store a frequency hopping sequence table as described below in connection with FIG. 7, such table containing a list of all of the possible frequency hopping sequences which the devices within the system 150 are able to utilize.

Each mobile terminal 166 also includes its own RF section 212 connected to the processor 200. The RF section 212 includes an RF receiver 214 which receives RF transmissions from a base station 154, 156 via an antenna 216 and demodulates the signal to obtain the digital information modulated therein. The RF section 212 also includes an RF transmitter 218. In the event the mobile terminal 166 is to transmit information to the system backbone 152 in response to an operator input at input device 202, for example, the processor 200 forms within the memory 210 an information packet including data together with a source address (i.e., the address of the particular mobile terminal 166 sending the information) and a destination address (e.g., the host computer 158 or other network device). The information packet is then delivered to the RF transmitter 218 which transmits an RF signal with the information packet modulated thereon via the antenna 216 to the base station 154, 156 with which the mobile terminal 166 is registered.

Like the RF sections 180 and 180' in the base stations 154 and 156, respectively, the RF section 212 of the mobile terminal 166 includes a frequency hopping (FH) modulating circuit 220 which controllably provides the hopping sequence employed by the RF transmitter 218 and RF receiver 214 for transmitting and receiving signals, respectively. The RF transmitter 218, RF receiver 214 and FH modulating circuit 220 are conventional in design and in the manner in which the transmitter and receiver hop through a sequence of carrier signal frequencies as controlled by the FH modulating circuit 220. Hopping sequence information is provided to the FH modulating circuit 220 from the processor 200. The FH modulating circuit 220 is controllable in the sense that the FH modulating circuit 220 receives hopping sequence information from the processor 200 and provides output signals to the RF receiver 214 and RF transmitter 218 which determine the carrier frequencies thereof as the receiver and transmitter each hop through the sequence of channels.

Each mobile terminal 166 also includes a programmable clock 224 which is identical in configuration to the clock 179 included in each base station 154. Whenever a mobile terminal 166 registers with a base station 154, the base station 154 provides the mobile terminal 166 with the universal time within the system 150 (as determined by its clock 179). The processor 200 in the mobile terminal 166 then sets its clock 224 to the universal time prior to proceeding with its normal operations. The output of the clock 224 is provided to the processor 200.

In addition, the mobile terminals 166 each include a received signal strength indicator (RSSI) circuit 226 which is coupled to the RF receiver 214 and produces a digital output indicative of the signal strength of signals received by the RF receiver 214. The output of the RSSI circuit 226 is coupled to the processor 200 and allows the processor to sample the RSSI signal when desired. The construction of the RSSI circuit 226 is conventional and can include, for example, an analog-to-digital converter (not shown).

Figures 7, 8, 9:
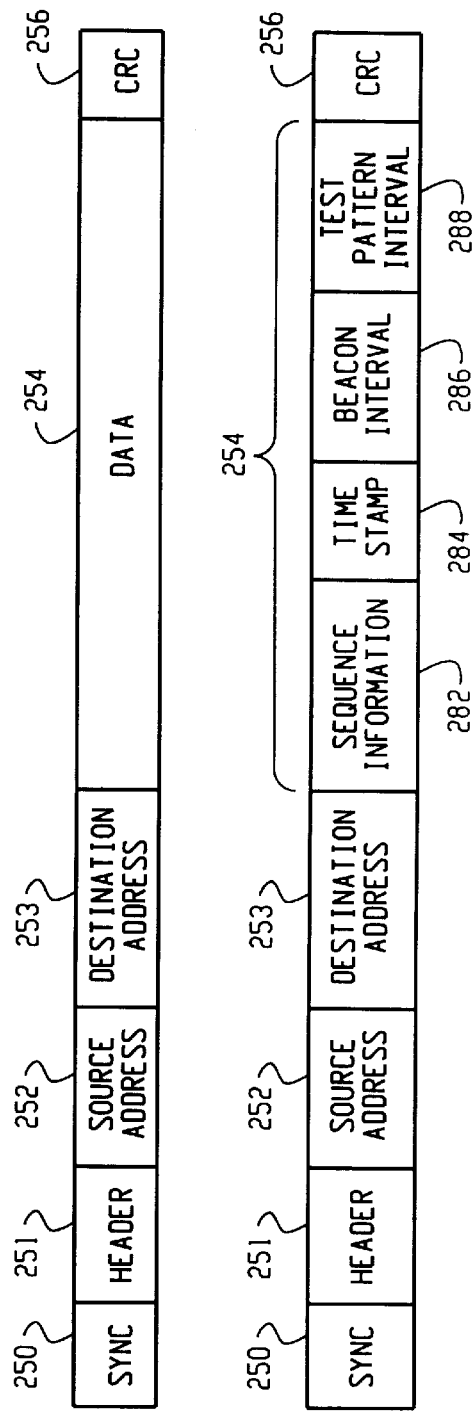
FIG. 7 is a schematic diagram of the contents of a frequency hopping sequence table maintained in memory in each base station and mobile terminal for identifying the particular frequency hopping sequences available in the cellular communication system in accordance with the present invention.
FIG. 8 is a schematic diagram representing an exemplary format for information packets which are communicated between devices in the cellular communication system in accordance with the present invention.
FIG. 9 is a schematic diagram representing a new base station registration packet used by base stations to communicate particular hopping sequence and timing information to the host computer in accordance with the present invention.

As mentioned above, the respective memory in the base stations 154, 156 and the mobile terminals 166 each has a frequency hopping sequence table stored therein. FIG. 7 represents the contents of such table in the exemplary embodiment. The system 150 is designed such that the respective devices can select from three different sets (Set 1 through Set 3) of predetermined frequency hopping sequences, with each set including twenty-six (A through Z) different sequences. Each frequency hopping sequence stored in the table represents a unique pseudo-random hop sequence with each sequence consisting of a sequence of 79 different hopping frequencies or channels. As will be appreciated, the particular sequences and/or the length of the sequences is not critical to the invention. According to the nomenclature utilized in FIG. 7, each hopping sequence can be identified by a set number (e.g., Set 1 through Set 3) and a pattern label (e.g., Pattern A through Pattern Z). Thus, each hopping sequence can be identified nominally as $f_{set,pattern}$, where $f_{set,pattern}$ is made up of a sequence of seventy-nine channels represented, in order, by $f_{set,pattern,1}$, $f_{set,pattern,2}$, ..., $f_{set,pattern,79}$. The hopping sequences represented in the hopping sequence tables are utilized by the processors in the base stations 154, 156 and mobile terminals to control their respective FH modulating circuit (190, 190', 220).

Referring briefly to FIG. 8, an exemplary format for packets sent between devices in the system 150 is shown. Each packet includes a number of fields such as a synchronization field 250, a header field 251, a source address field 252, a destination address field 253, a data field 254, and an error correcting field 256, for example. The synchronization field 250 includes synchronizing bits which allow a device receiving the packet an opportunity to "sync" to the packet as is conventional. The header field 251 follows the synchronization field 250 and includes information such as the length and type of the packet. For example, the header field 251 may indicate whether the packet is a type which requires a response from the receiving device. The source address field 252 follows the header field 251 and includes the address of the device from which the packet originated. Following the source address field 252, the packet includes a destination address field 253 which holds the address of the device to which the packet is ultimately destined. The data field 254 in the packet includes various information intended to be communicated to the receiving device. The packet ends with a cyclical redundancy code (CRC) field 256 which serves as an error correcting field according to conventional techniques such that a receiving device can determine if it has properly received the packet. The particular packet format may vary from system to system, and FIG. 8 is intended merely to be exemplary.

In accordance with the preferred embodiment, the base stations 154 communicate with the host computer 158 over the system backbone 152 regarding the particular hopping sequence being utilized by the respective base stations and corresponding timing information. As discussed in more detail below, the base stations 154 transmit to the host computer 158 base station registration packets 280 upon newly registering in the system 150. More specifically, as shown in FIG. 9 the data field 254 in each base station registration packet 280 includes a sequence information field 282, a time stamp field 284, an optional beacon interval field 286 and an optional test pattern interval field 288. The sequence information field 282 includes information referring to the particular hopping sequence in the frequency hopping sequence table (FIG. 7) that is being used by the base stations 154 (and any associated wireless base stations 156) transmitting the base station registration packet 280. Such information is indicated nominally, at least, by set number and pattern label in correspondence with in FIG. 7. Accordingly, a base station using the hopping sequence consisting of the channel sequence $f_{2B1}$, $f_{2B2}$, ..., $f_{2B79}$ would include information identifying $f_{2B}$ in the sequence information field 282. Such information can be in the format [set; pattern], or [Set 2, Pattern B].

The time stamp field 284 includes a start time relative to the universal clock kept throughout the system 150. In the exemplary embodiment, the particular time in the time stamp field 284 represents the precise start time at which the base station 154 began or will begin its hopping sequence $f_{set,pattern}$. More specifically, the time stamp in field 284 identifies the time at which the leading edge of the first channel in the sequence $f_{set,pattern,1}$ begins relative to the universal clock. Since the processor 176 in each base station controls the hopping sequence of the base station via the FH modulating circuit 190, the processor 176 controls the start of the hopping sequence so as to begin at the time represented by the time stamp field 284. Alternative, the processor 176 may simply sample the universal clock time as provided by the clock 179 (FIG. 4) at such time when the FH modulating circuit 190 begins the first channel or hop in its hopping sequence. In either case, the 64-bit start time (in units of microseconds) is identified in the time stamp field 284.

The wireless base stations 156 will adopt the same hopping sequence and start time as the base station 154 to which they register. Thus, a wireless base station will scan for a nearby base station 154, 156 and adopt its hopping sequence and start time in a manner similar to that of mobile terminals as discussed below. In the case of the wireless base station 156, however, it will transmit a base station registration packet 280 to the host computer 158 via the base station 154 to which it is registered (directly or indirectly). The host computer 158 thereby accumulates operating information for both hardwired base stations 154 and wireless base stations 156 as further discussed below.

The beacon interval field 286 includes information indicative of how often and when beacon packets will be transmitted by the particular base station 154, 156 sending the packet 280 via its RF section in the event a passive scanning mode is employed as discussed below. Typically, a base station will transmit beacon packets a predetermined number of times per channel, the beacon packets being equally spaced apart. For example, the base station 154, 156 may be preprogrammed to transmit beacons twice per channel, and specifically at the beginning and middle of each channel. Accordingly, the information in the beacon interval field 286 may indicate a "beacon rate"=2 beacons per channel, such beacons occurring at $t_{dwell=}0$ and 50 (in the case where the total dwell time on each channel is 100 msec). The information in the beacon interval field 286 can be, for example, in the format [number of beacons per channel; $t_{dwell}$ times at which beacons occur]. In the above example, the beacon interval field 286 would contain [2;0,50]. Preferably, however, the information in the beacon interval field 286 would take the alternative format [number of beacons per channel; $t_{dwell}$ time of first beacon]. In the alternative embodiment it is assumed to be known that all beacons occur at evenly spaced intervals and thus may reduce the need for an additional field. Further, the alternative embodiment allows the information to be passed in fields having a constant length which helps reduce the RF bandwidth needed to transmit the information. Such information is useful so that if a mobile terminal 166 is passively scanning for a new base station, it knows when to expect a beacon and can "look" for a beacon packet at that particular time to lock-on to the new hopping sequence as is described further below.

The test pattern interval field 288 includes information indicating when and how often the particular base station 154, 156 sending the packet 280 transmits a test pattern packet via its RF section. As is conventional, a test pattern packet is a packet containing known data which allows a mobile terminal 166 to receive the packet and measure the signal quality of transmissions between the base station 154, 156 and the mobile terminal 166. As described below in connection with FIG. 15, the mobile terminals 166 use the test pattern packets to determine when to begin scanning for a new base station and, if already scanning, to help determine if a selected new base station provides better signal quality than the previous base station.

Test pattern packets typically are not transmitted by a base station 154, 156 on every channel in the hopping sequence, but rather are transmitted at intervals which exceed the dwell time on each channel. For example, a test pattern packet typically may be transmitted by a base station 154, 156 once every predetermined number of milliseconds, such as every 300 msec in the hopping sequence beginning at the start of the hopping sequence (i.e. the start time represented in field 284 for the particular base station). Accordingly, the information in the test pattern interval field 288 may be in the format of the number of milliseconds between test patterns or [time interval].

Figure 10:
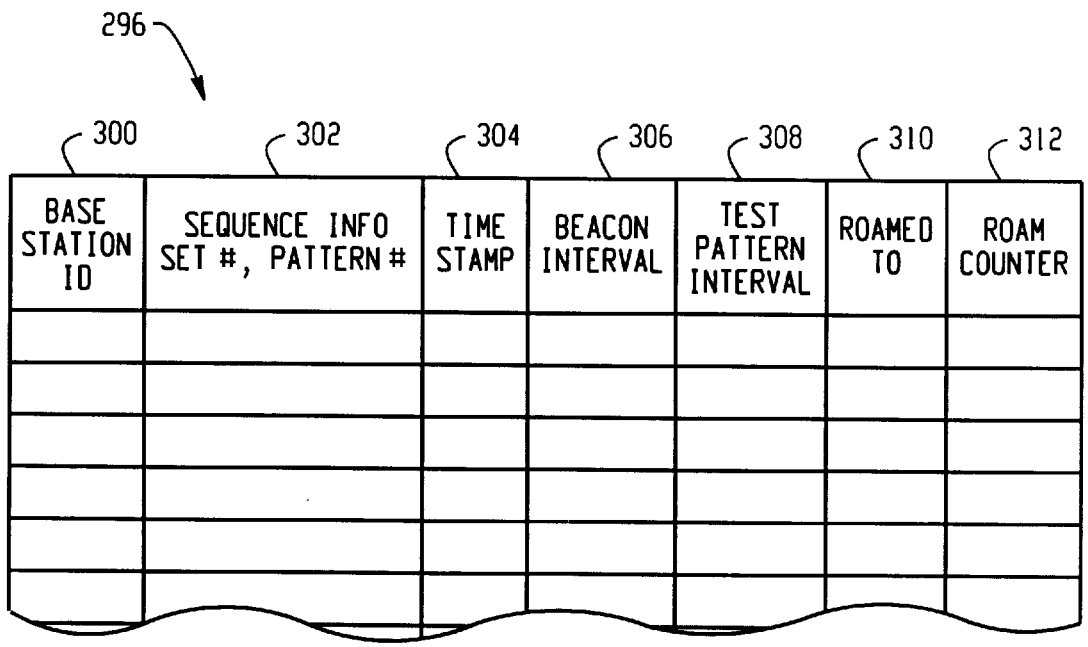
FIG. 10 is a schematic diagram of a roaming table which is maintained in memory in each base station in accordance with the present invention.

FIG. 10 shows the manner in which each base station 154, 156 stores the information contained in the base station registration packets as received from the host computer 158 in a roaming table 296 in its respective memory 178, 178'. As described below, the host computer 158 receives the base station registration packets 280 from all of the base stations within the system 150. The host computer 158 accumulates and maintains such information in a table described below in relation to FIG. 12F. Each time a base station registers in the system 150, the host computer 158 provides to the base station such information relating to all the other base stations within the system. In addition, each time a base station is newly added to the system 150, the host computer 158 updates its own table as well as it broadcasts updates to all of the base stations in the system 150 so that the base stations 154, 156 may update their respective tables 296. Each entry is represented by a row in the table 296 and corresponds to a respective base station in the system 150. As shown in FIG. 10, each entry includes a base station identification address 300, a hopping sequence 302, a time stamp 304, an optional beacon interval 306 and test pattern interval 308, a roamed to indicator 310, and a roam counter value 312. The base station identification address 300 is in the format [base station ID] and indicates the network address of the base station 154, 156 which sent the base station registration packet 280 used by the host computer 158 to create the entry.

The hopping sequence 302 corresponds to the particular hopping sequence being utilized by the corresponding base station as obtained from the information provided by the host computer 158. Such information is stored in the roaming table 296 in the format [set; pattern]. The time stamp field 304 includes the start time associated with the corresponding base station in the table entry. Like the hopping sequence information in field 302, the start time in the time stamp field 304 is obtained via the host computer 158 from the information included in the base station registration packet 280 (fields 280, 282) for the corresponding base station 154, 156 identified in field 300 of table 296.

The beacon interval field 306 includes the information originally received by the host computer 158 in the beacon interval field 286 of the base station registration packet 280, namely information in the format [number of beacons per channel; $t_{dwell}$ times at which beacons occur]. The test pattern interval field 308 includes the information received in the test pattern interval field 288 of the base station registration packet 280. More specifically, the test pattern interval 308 includes the information in the form of the number of milliseconds in between test patterns.

The roamed to indicator 310 contains a flag bit which is set to indicate whether a mobile terminal 166 which was registered with the base station in which the roaming table 296 is being maintained has roamed to the base station which corresponds to the entry over the last 24 hours, for example. Thus, if the flag bit is set in the roamed to indicator 310 in any given entry, this indicates that a mobile terminal has roamed thereto in the last 24 hours from the base station in which the roaming table is maintained. The processor 176, 176' is programmed to maintain this information based on registration packets received from other base stations via the system backbone 152. Such packets indicate that a mobile terminal 166 which was previously registered to the base station has recently registered with one of the other base stations, as discussed below in connection with FIG. 13. If a registration packet is not received from one of the base stations in the roaming table for over 24 hours, the processor 176, 176' is programmed to reset the flag bit in the corresponding roamed to indicator 310. As will be appreciated, the roamed to indicator 310 is a useful indication of which base stations 154, 156 the mobile terminals 166 previously registered to the present base station had a tendency to move on to. This information is helpful in determining which base stations a mobile terminal 166 should attempt to register with when seeking a new base station as discussed below with respect to FIG. 17. Generally speaking, the fact that a mobile terminal 166 has roamed to a particular base station in the last 24 hours (or other predetermined period of time) can be indicative of a higher probability that a mobile terminal 166 will roam to that base station in the future.

The roam counter value 312 in the roaming table 296 represents the number of mobile terminals 166 which were previously registered to the present base station 154, 156 maintaining the roaming table 296, and have newly registered with a base station corresponding to the particular entry in the roaming table 296 over the last hour, for example. The processor 176, 176' is programmed to maintain this information based on the registration packets received from other base stations via the system backbone 152 as discussed below in connection with FIG. 13. If a registration packet is received indicating that a mobile terminal 166 previously registered to the present base station has now registered with a new base station, the processor 176, 176' is programmed to increment by one the roam counter value 312 for the corresponding entry. At the same time, the processor 176, 176' is programmed to maintain the count so as to reflect only the number of mobile terminals which have roamed over the last one hour (or other predetermined time period). The roam counter value 312 is a useful indication of which base stations 154, 156 the mobile terminals 166 which had previously been registered to the present base station have a tendency to move on to. This information is also helpful in determining which base stations a mobile terminal 166 should attempt to register with when seeking a new base station as discussed below with respect to FIG. 17. Generally speaking, the fact that there has recently been a large number of mobile terminals 166 roaming to a particular base station can be indicative of a higher probability that a mobile terminal 166 will roam to that base station in the future. A similar analysis could alternatively be based on the average number of roams that occurred over a selected period of time.

Figure 11:
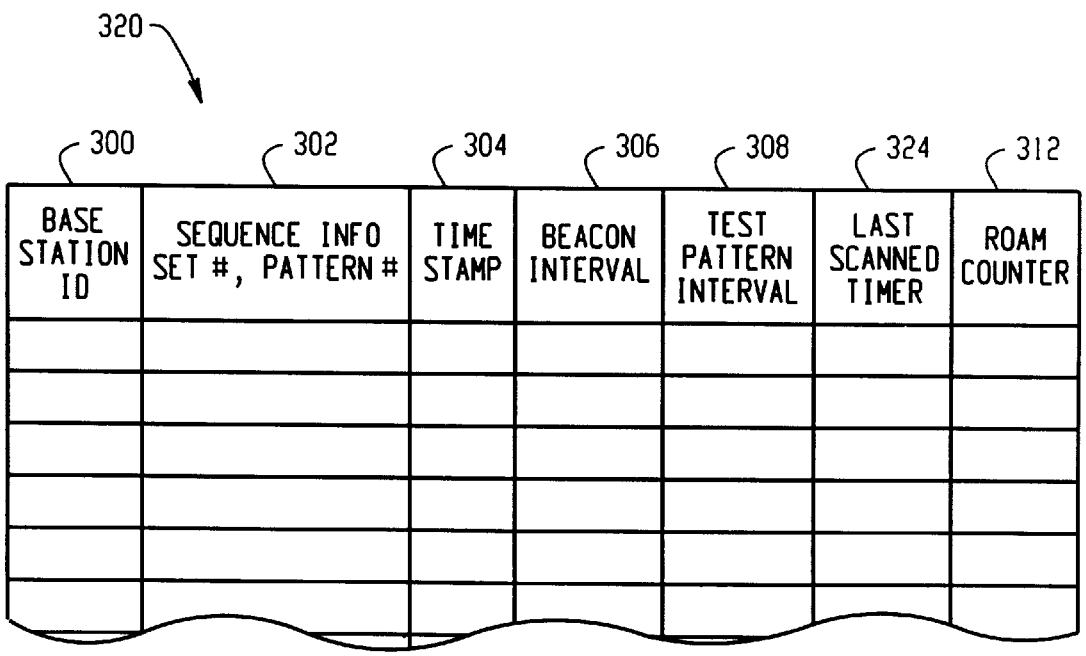
FIG. 11 is a schematic diagram of a reduced roaming table which is maintained in memory in each mobile terminal in accordance with the present invention.

Referring now to FIG. 11, the general format is shown for a reduced roaming table 320 which is stored in the memory 210 of each mobile terminal 166. The contents of the reduced roaming table 320 are based on information included in the roaming table 296 of the base station 154, 156 with which the mobile terminal 166 is currently registered as indicated above. The reduced roaming table 320 is similar to the roaming table 296 in that each entry is represented by a row in the table 320 and corresponds to a respective base station in the system 150. Unlike the roaming tables 296 in each base station, however, the reduced roaming table 320 does not include an entry for every base station in the system. Rather, the reduced roaming table 320 only includes entries for those base stations which are predetermined likely to be new base stations with which the mobile terminal 166 may register as determined in the manner described below.

As shown in FIG. 11, each entry includes a base station identification address 300 and a hopping sequence 302 identical to that included in the roaming table 296. The time stamp 304 is identical to time stamp in the roaming table 296. The beacon interval field 306 is identical to that stored in the roaming table 296. The test pattern interval field 308 is in the same format as the test pattern interval in the roaming table 296. The information in the roam counter 312 is identical to the roam counter 312 in the roaming table 296 and is updated each time the mobile terminal 166 receives a roaming table update packet as described in more detail below.

Unlike the roaming table 296, the reduced roaming table 320 does not include a roamed to indicator 310. On the other hand, the reduced roaming table 320 does include a last scanned indicator 324 which is maintained by the processor 200 in each mobile terminal 166. The processor 200 is preprogrammed to keep track of how much time has passed since the mobile terminal 166 has attempted to lock onto the hopping sequence of the associated base station 154, 156. This can be done using conventional timing techniques such as a timer incorporated within the mobile terminal 166. Such information is utilized by the mobile terminal 166 in order to prioritize which new base stations 154, 156 the mobile terminal should attempt to lock onto initially as discussed below in connection with FIG. 17.

Figure 12A:
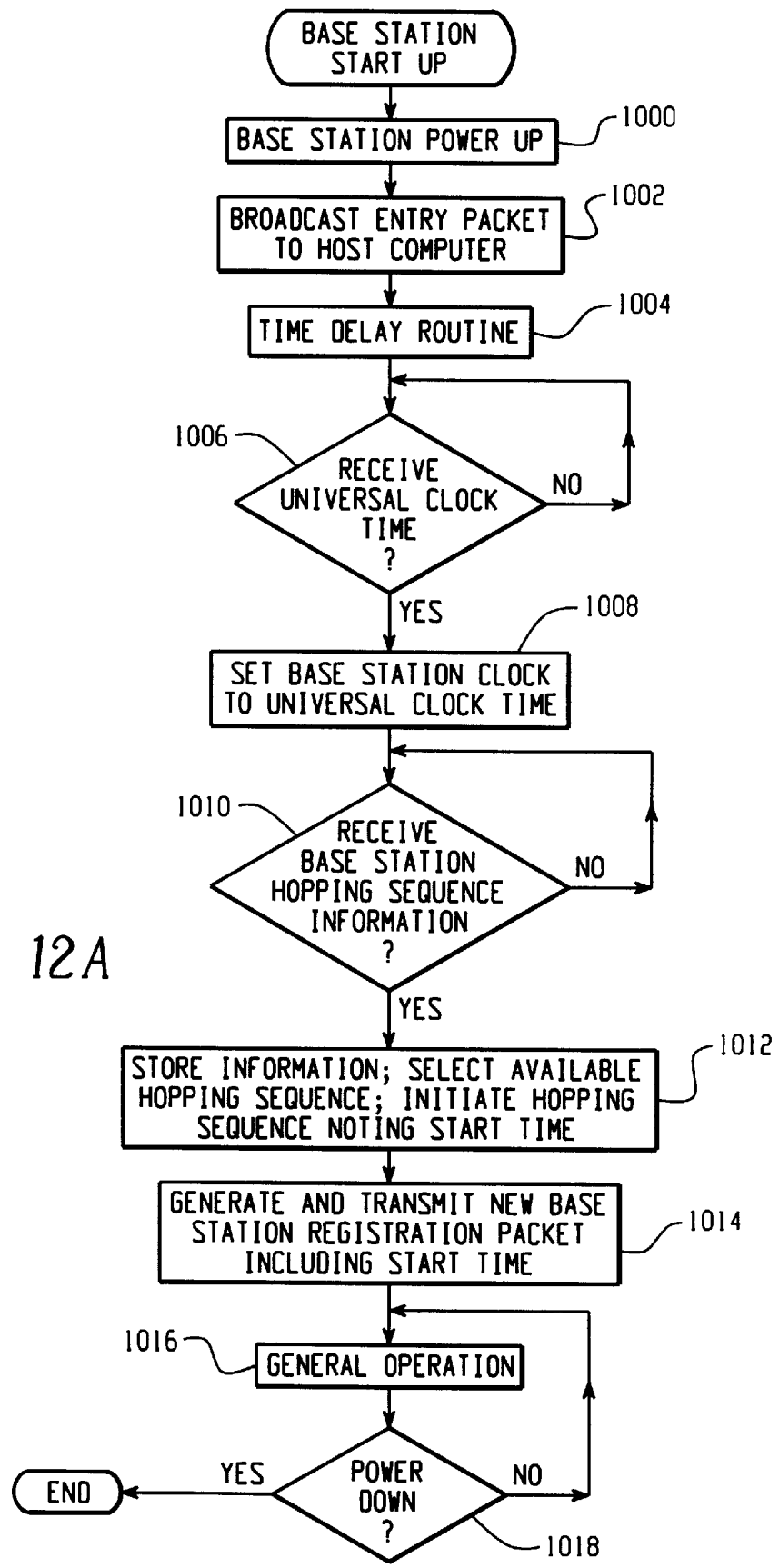
FIG. 12A is a flowchart representing the operation of a base station when selecting a hopping sequence and constructing a roaming table upon powering up in accordance with the present invention.
Figure 12B:
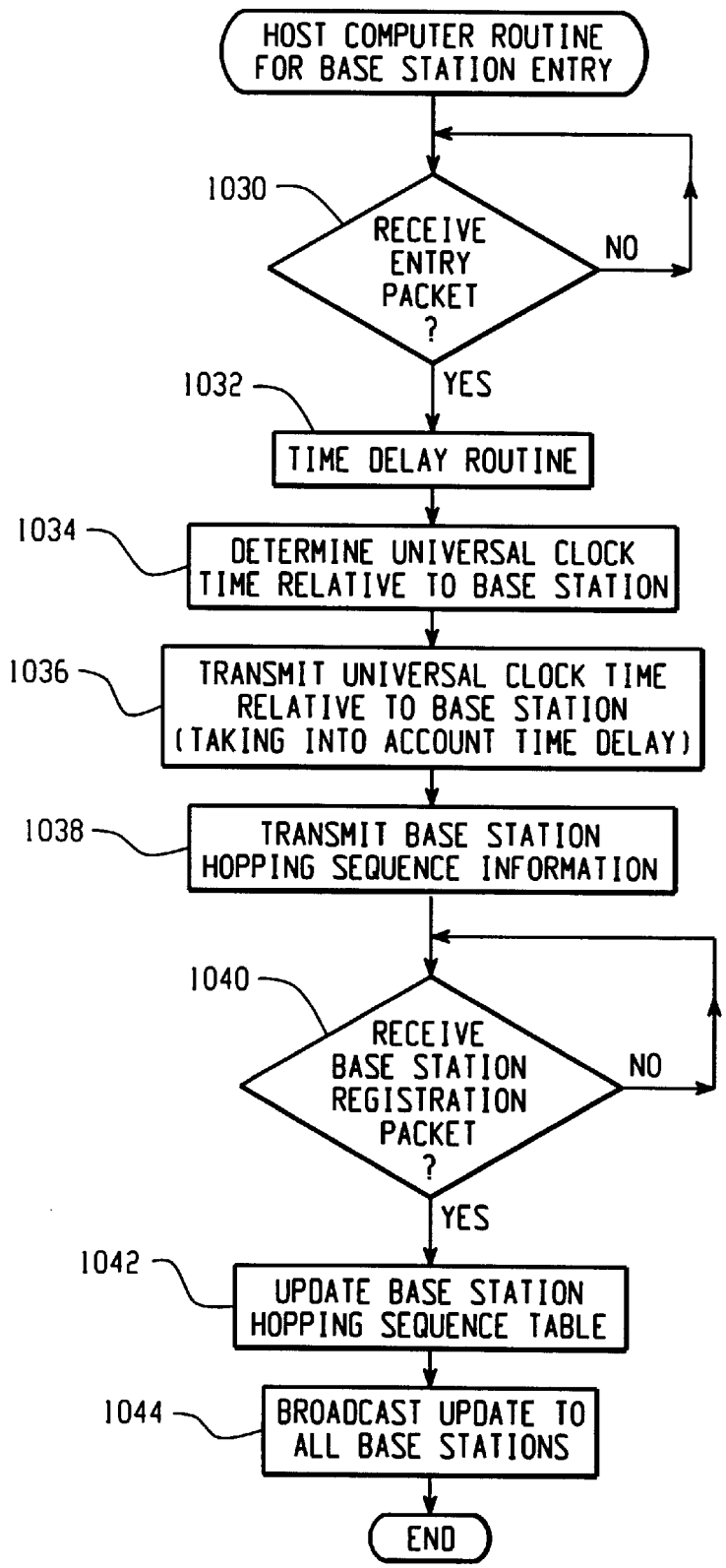
FIG. 12B is a flowchart representing the operation of the host computer in response to a base station entering the system in accordance with the present invention.

Referring now to FIGS. 12A through 12F, the procedure according to which each base station 154 may enter the system 150 is illustrated. FIG. 12A shows the general procedure carried out by a typical base station 154, and FIG. 12B shows the corresponding operation of the host computer 158. Referring initially to FIG. 12A, after a base station 154 has been connected to the system backbone 152, the base station 154 is powered up initially as represented in step 1000. Such powering up can be as a result of turning on a switch, plugging in a base station power cord to a power source, a reset operation, etc. After powering up and upon completing any self-initialization routines, the processor 176 is programmed to generate and broadcast an "entry" packet to the host computer 158 as represented in step 1002. The entry packet is broadcast in the event the base station 154 has not yet learned the address of the host computer 158. The entry packet is received by the host computer 158 directly via the system backbone 152.

The entry packet which is transmitted in step 1002 includes in its source address field 252 the address of the particular base station 154 which has recently powered up. The data field 254 includes information identifying the base station 154 as having entered the system 150 and requesting that the host computer 158 allow the base station 154 to register in the system. Following step 1002, the base station 154 proceeds to step 1004 in which it carries out a routine for determining a time delay in conjunction with the host computer 158. As is described more fully in association with FIGS. 12C through 12E, step 1004 involves determining an average delay time for a packet transmitted between the host computer 158 and the particular base station 154. Since the clock 179 in the base station 154 will need to be synchronized to the universal clock time maintained by the host computer 158 as described below, and since the host computer 158 will need to communicate to the base station 154 the universal clock time, step 1004 determines the average delay time for such communication so that it can be accounted for by the host computer 158 (or alternatively the base station 154).

Following step 1004, the base station 154 proceeds to step 1006 in which the processor 176 determines if the base station 154 has received yet the universal clock time from the host computer 158. If not, the processor 176 continues to loop around step 1006. Upon receiving the universal clock time as determined in step 1006, the base station 154 proceeds to step 1008 in which the processor 176 substantially immediately sets the clock 179 to the universal clock time provided by the host computer 158. Next, the processor 176 determines in step 1010 whether base station hopping sequence information has yet been received from the host computer 158. As described below in connection with FIG. 12F, the host computer 158 maintains a base station hopping sequence table which includes the hopping sequence, start time (i.e, the start time of the hopping sequence in relation to the universal time clock), beacon information and test pattern interval for each base station 154, 156 which has registered in the system 150. The host computer 158 is programmed to transmit to the newly powered up base station 154 the information included in the its base station hopping sequence table following the transmission of the universal clock time for the base station (see discussion of FIG. 12B). Accordingly, the base station 154 continues to loop around step 1010 until such information has been received.

Upon receiving the contents of the base station hopping sequence table from the host computer 158, the base station 154 stores such information in step 1012. More particularly, the base station 154 creates an entry in its roaming table 296 (FIG. 10) for each base station identified in the base station hopping sequence information provided by the host computer 158. The base station identification address 300 includes the same address provided by the host computer 158. The hopping sequence 302, beacon interval 306 and test pattern interval 308 are identical to the corresponding entries provided by the host computer 158. The time stamp in field 304 includes the particular start time for the corresponding base station entry as provided by the host computer 158. Again, the start time identifies the time, in relation to the universal clock maintained by the host computer 158, at which the corresponding base station entry begins the first hop in the hopping sequence identified in field 302. The roamed to field 310 and roam counter 312 for all of the entries are currently are set to zero by the base station processor 176.

Also in step 1012 the processor 176 reviews the hopping sequence information provided by the host computer 158 in order to determine what particular hopping sequence(s) are available for the base station 154 to select for its own use. Specifically, the processor 176 evaluates the hopping sequence information provided in the hopping sequence entries 302 of table 296 to determine what particular hopping sequences are being used by the other base stations 154, 156 in the system 150. As noted above, each base station 154 will be using its own unique hopping sequence and the wireless base stations 156 will be using the hopping sequence of the base station 154 with which it is associated. In step 1012, the processor 176 compares the particular hopping sequences being used by the other base stations 154, 156 with the possible hopping sequences in the system 150 as identified in the frequency hopping sequence table (FIG. 7) stored in memory 178.

Still in step 1012, the processor 176 is programmed so as to select any one of the hopping sequences included in the frequency hopping sequence table which is not being used by any of the other base stations 154, 156 as identified in the hopping sequence entries 302. The selected hopping sequence then becomes the hopping sequence for that particular base station 154. The processor 176 then sets the FH modulating circuit 190 (FIG. 4) in the RF section 180 such that the base station 154 is configured to transmit and receive radio transmissions using the hopping sequence selected in step 1012. Finally in step 1012, the processor 176 causes the FH modulating circuit 190 to initiate the selected hopping sequence at an arbitrarily selected universal clock time as determined by the clock 179. Such arbitrarily selected universal clock time represents the "start time" for the base station 154. Alternatively, the processor 176 instructs the FH modulating circuit 190 to begin the selected hopping sequence and records as the "start time" the universal clock time at such time and as determined by the clock 179.

Following step 1012, the processor 176 proceeds to step 1014 in which it generates a "new base station registration" packet to be transmitted to the host computer 158. Referring briefly to FIG. 9, the new base station registration packet includes in its source address field 252 the network address of the base station 154. In its data field 254, the new base station registration packet includes in field 282 the hopping sequence [set;pattern] selected by the base station 154 in step 1012. The data field 254 also includes the time stamp in field 284 which is the exact "start time" of the hopping sequence as determined by the processor 176 in step 1012. The beacon interval field 286 and test pattern interval field 288 contain the particular beacon interval and test pattern interval, respectively, for the base station 154 as described above. Upon generating the new base station registration packet, the processor 176 proceeds to transmit the new base station registration packet to the host computer 158 via the system backbone Following step 1014, the processor 176 proceeds to step 1016 in which the base station 154 then begins normal communications within the system 150 (e.g., relating to inventory tracking, patient information, etc., as well as registering mobile terminals, etc.). The base station 154 remains in its general operations until such time as it is powered down or reset as determined in step 1018.

Unlike base stations 154, the wireless base stations 156 do not utilize a unique hopping sequence as previously mentioned. Rather, the wireless base stations 156 must register with another base station 154 directly or via another wireless base station 156 which provides an access path to the system backbone 152. Therefore, in order for communication to occur the wireless base stations 156 must adopt the hopping sequence of the base station 154, 156 with which it registers. In the preferred embodiment, upon powering up a wireless base station 156 performs what is conventionally known as an exhaustive scan in order to determine all possible base stations 154, 156 to which it may register. An exhaustive scan, which is known to those having ordinary skill in the art, is one in which scanning for a possible base station continues even after a possible base station is found in order to determine if there are other possible base stations 154, 156 with which may provide for better system performance. Thus, exhaustive scans typically provide that the wireless base station 156 actively or passively scans all channels for a predetermined period of time wherein the predetermined period of time is long enough to give a very high probability of finding all possible base stations available.

Following the exhaustive scan, the wireless base station 156 selects the base station 154, 156 which provides the best system performance based on conventional criteria such as signal quality, traffic load, and the number of system hops needed to reach the system backbone 152. The wireless base station adopts the hopping sequence of the selected base station and proceeds to register therewith using conventional techniques. As an exception to such conventional registration techniques, however, is that the base station 154, 156 which the wireless base station 156 selects also communicates to the wireless base station 156 the universal clock time as determined from clock 179, 179'. The wireless base station 156 substantially immediately processes such information and sets its own clock 179' to the universal clock time provided by the selected base station. In this way, the clock 179' of the wireless base station 166 is synchronized with the universal clock time within the system 150. In addition, the wireless base station 166 is programmed to generate and transmit a new base station registration packet to the host computer 158, via the selected base station, in order to inform the host computer of its entrance to the system. The host computer 158 then proceeds to update its base station table as discussed below.

It is noted that with respect to wireless communications between a base station and another base station or mobile terminal, the delay time incurred between when a base station transmits a packet and another base station or mobile terminal receives a packet is relatively insignificant as compared to the delay incurred on the system backbone 152. Accordingly, for purposes of the present embodiment a time delay which occurs between a base station transmitting the universal clock time to another base station or mobile terminal 166 is assumed to be insignificant. The validity of such assumption increases as the frequency hopping dwell time within the system and/or the data transmission rate (e.g., Mbits/sec) between the base station and the other base stations and/or mobile terminals increases as will be appreciated. Nevertheless, a routine similar to that discussed below in connection with FIGS. 12C and 12D can be employed to calculate and compensate for the average delay time between a base station and another base station or mobile terminal if desired.

Turning now to FIG. 12B, the corresponding routine carried out by the host computer 158 upon a new base station registering is shown. In step 1030, the host computer 158 determines if it has received a base station entry packet via the system backbone 152 (corresponding to step 1002 in FIG. 12A). If no, the host computer 158 continues through step 1030 waiting to receive such entry packet. Upon receiving an entry packet as determined in step 1030, the host computer 158 proceeds to step 1032 in which it determines the aforementioned average time delay for communications between the host computer 158 and the base station 154 (as detailed below in relation to FIGS. 12C through 12E.

Upon determining the time delay in step 1032, the host computer 158 proceeds to step 1034 in which it computes the universal clock time for the base station 154 which is in the process of registering. Specifically, suppose the average time delay as determined in step 1032 is represented by $T_{delay}$. In step 1034 the host computer 158 samples the universal clock time, represented by $T_{univ}$, which is maintained by a universal clock within the host computer 158 as discussed below in connection with FIG. 12G. Substantially instantaneously, the host computer 158 computes the universal clock time for the base station 154 ($T_{univbase}$) by taking into account the time delay as follows:

$$T_{univbase} = T_{univ} + T_{delay}$$

Immediately following step 1034, the host computer 158 proceeds to step 1036 in which it transmits to the base station 154 via the system backbone 152 the universal clock time for the base station $T_{univbase}$. As the universal clock time $T_{univbase}$ takes into account the time delay incurred in transmitting such information to the base station 154, such clock time represents the actual universal clock time of the system 150 upon being received by the base station (step 1006 in FIG. 12A). Following step 1036, the host computer 158 proceeds to step 1038 in which it proceeds to transmit to the base station 154 the contents of its base station hopping sequence table (FIG. 12F). Such information is utilized by the base station for selecting a hopping sequence as discussed above in relation to steps 1010 and 1012 of FIG. 12A.

After step 1038, the host computer 158 waits in step 1040 to receive a new base station registration packet from the base station 154 as discussed above in relation to step 1014 of FIG. 12A. Upon receiving the new base station registration packet as determined in step 1040, the host computer 158 continues to step 1042 in which it updates the contents of its base station hopping sequence table (FIG. 12F) by adding the new base station thereto based on the information in the new base station registration packet. Finally, in step 1044 the host computer 158 broadcasts a new base station update notice to all base stations 154, 156 within the system 150. Such notice includes the address of the newly registered base station 154, together with the base station start time, beacon interval and test pattern interval as determined from the new base station registration packet received in step 1040. The base stations 154, 156 in turn update their roaming tables 296 as discussed below in relation to FIG. 13. It is noted that step 1044 also is carried out by the host computer 158 in response to receiving a new base station registration packet from a wireless base station 156.

Figure 12C:
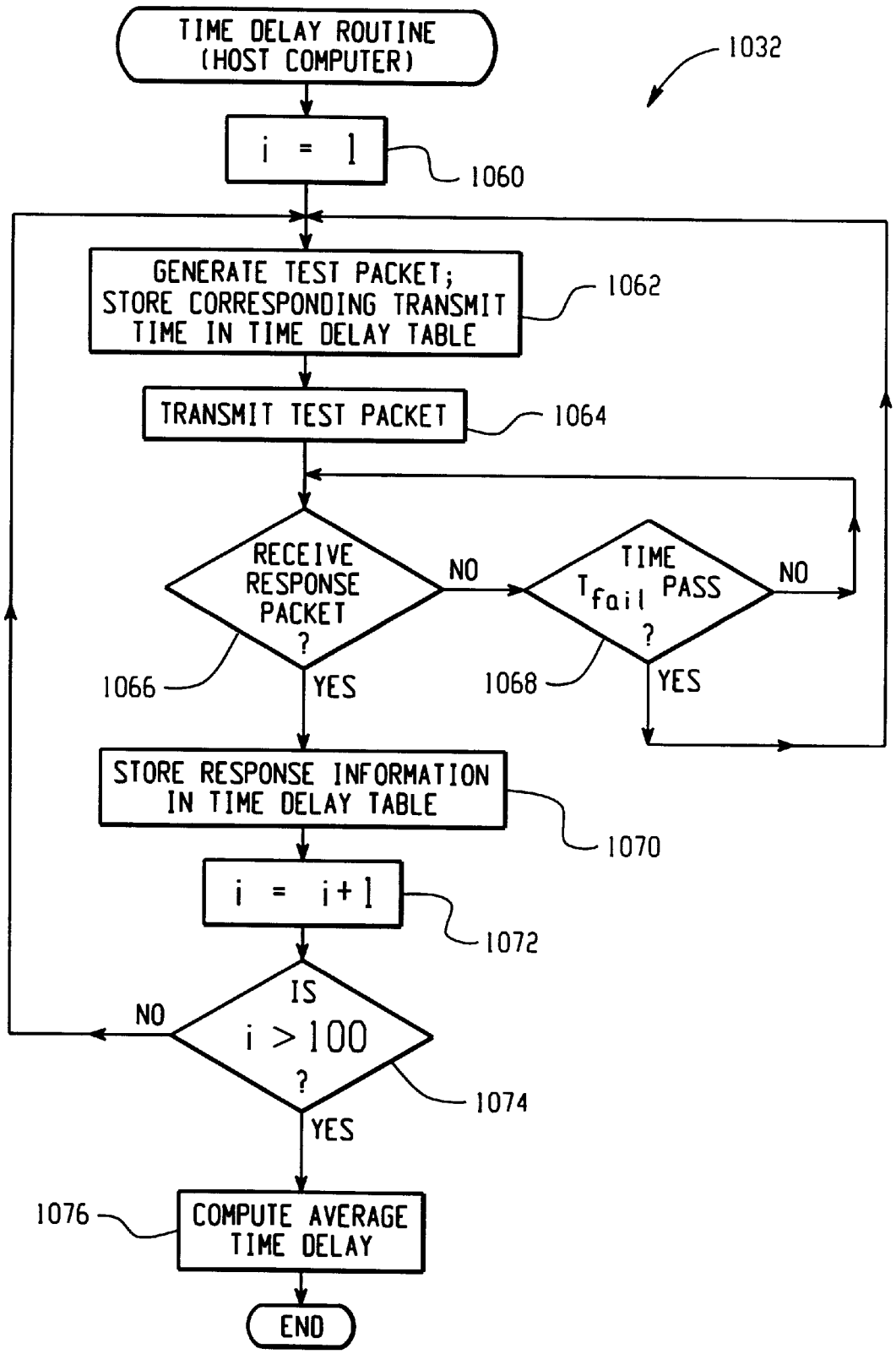
FIG. 12C is a flowchart representing the operation of the host computer when determining a time delay for communications between the host computer and a base station in accordance with the present invention.
Figure 12D:
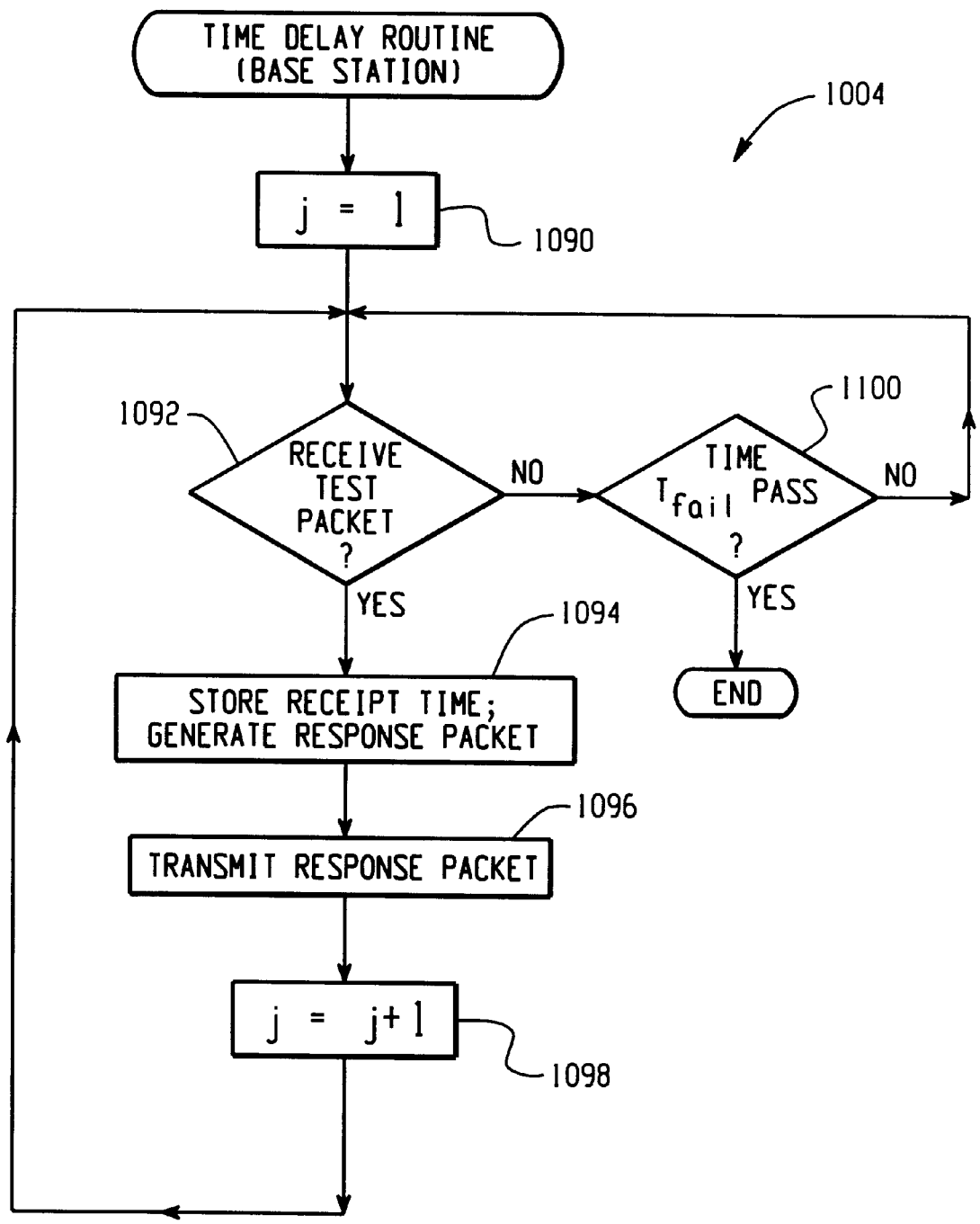
FIG. 12D is a flowchart representing the operation of a base station when the time delay for communications between the base station and the host computer is being determined.

FIGS. 12C through 12E illustrate the general procedure carried out by the host computer 158 and a base station 154 when determining the aforementioned time delay $T_{delay}$ (steps 1004 and 1032). Generally, the procedure involves the host computer 158 sending a plurality (e.g., 100) of separate packets to the base station 154 seeking to register, computing an average time which it takes for the base station to respond to the packets, and dividing by two. FIG. 12C shows the steps carried out by the host computer 158 as part of step 1032. Beginning in step 1060, the host computer sets counter variable "i" to 1. Next, in step 1062 the host computer 158 generates a test packet which is identified as such in its data field 254. The destination address in field 253 of the test packet is obtained based on the entry request packet transmitted by the base station 154 in step 1002 of FIG. 12A. The source address is that of the host computer 158. Immediately prior to transmitting the test packet the host computer 158 in step 1062 stores in a time delay table (FIG. 12E) the universal clock time [transmit time] at which the corresponding test packet is to be transmitted. Then, in step 1064 the host computer 158 transmits the test packet.

Following step 1064, the host computer 158 proceeds to step 1066 in which it waits to receive a packet from the base station 154 in response to the test packet i. Specifically, in step 1066 the host computer 158 determines if it has received a response packet. If not, the host computer 158 goes to step 1068 in which it determines if a predetermined time $T_{fail}$ has passed since the test packet was transmitted in step 1064. The time $T_{fail}$ is predetermined to be the longest reasonable time which it could be expected for a base station 154 to respond to a test packet. If time $T_{fail}$ has elapsed as determined in step 1068, it is assumed that the test packet was not successfully received by the base station 154 and the host computer 158 returns to step 1062 where the test packet is retransmitted. Otherwise, the host computer 158 returns to step 1066. Upon receiving the response from the base station as determined in step 1066, the host computer 158 proceeds to step 1070 in which it stores the information included in the response packet in the corresponding entry of the time delay table of FIG. 12E.

As described more fully below in connection with FIG. 12D, each response packet from a base station 154 includes a time [base station receipt time] at which the base station 154 received the test packet and a time [base station transmit time] at which the base station transmitted the response packet back to the host computer 158. Although the base station receipt time and base station transmit time are based on a base station clock 179 which has not yet been synchronized to the universal clock time in the host computer 158, the difference between the two times still is indicative of any processing delays within the base station 154 due to generating the response packet which are separate from the actual time delays which occur for communications between the host computer 158 and the base station 154. Referring briefly to FIG. 12E, the host computer 158 stores in step 1070 (FIG. 12C) the base station receipt time and base station transmit time in the time delay table for the corresponding test packet i. In addition, the host computer 158 stores the universal clock time [receipt time] at which the response packet was received from the base station 154.

Also in step 1070 the host computer 158 calculates the time delay $t_{delay}$ (in microseconds) associated with the particular test packet i as follows:

$$t_{delay}=(([\text{receipt time}]-[\text{transmit time}])-([\text{base station transmit time}]-[\text{base station receipt time}]))/2$$

The time delay $t_{delay}$ is then stored by the host computer 158 in step 1070 in the time delay table represented in FIG. 12E for the corresponding test packet.

Following step 1070 the host computer 158 in step 1072 increments the counter i and proceeds to step 1074. In step 1074 the host computer checks whether i is greater than 100. If no, this indicates that the host computer 158 in step 1032 has not yet obtained time delay data on 100 test packets. Accordingly, the host computer 158 returns to step 1062 where the next test packet is generated and transmitted to the base station 154 and the above described steps are repeated. Upon i being greater than 100 as determined in step 1074, the host computer 158 concludes the process of transmitting test packets. Then, the host computer 158 proceeds to step 1076 in which it calculates the average time delay $T_{delay}$ by computing the average of the 100 time delays $t_{delay}$ stored in the time delay table. It will be appreciated that a number other than 100 test packets can be used in carrying out the process shown in FIG. 12C. Also, upon calculating the average time delay $T_{delay}$ the host computer 158 can clear its time delay table as will be appreciated. Following step 1076, the host computer 158 proceeds to step 1034 in FIG. 12B.

FIG. 12D shows the corresponding operation of the base station 154 in determining the time delay (step 1004). Initially, the processor 176 sets a counter variable j equal to 1 in step 1090. Next, in step 1092 the processor 176 determines if it has received a test packet from the host computer 158. The test packet is identified as such by the host computer 158, and the base station processor 176 is programmed to process test packets immediately. If a test packet is received as determined in step 1092, the processor 176 proceeds to step 1094 in which it temporarily stores the time at which the test packet was received relative to the clock 179. In addition, the processor 176 generates a response packet which includes the stored time at which the test packet was received (i.e., the [base station receipt time]) together with the time at which the response packet is to be transmitted back to the host computer 158 (i.e., the [base station transmit time]). The destination address in the response packet includes the address of the host computer 158 which, if not previously known by the base station 154, is ascertained from the source address of the test packet. Next, the processor 176 proceeds to step 1096 in which it causes the base station 154 to transmit the response packet at the particular base station transmit time identified in the response packet. This is done by controlling the transmission so that it takes place when the clock 179 reaches the base station transmit time. Following step 1096 the processor 176 increments j by 1 in step 1098. Thereafter, the processor 176 returns to step 1092.

If in step 1092 the processor 176 does not receive a test packet, the processor 176 proceeds to step 1100 in which it determines if j is greater than 100 so as to indicate that 100 test packets have already been responded to. If no, the processor 176 returns to step 1092 to again determine if a test packet has been received. If in step 1100 j is greater than 100, this indicates that the routine for determining the time delay has been completed. The processor 176 then returns to step 1006 in FIG. 12A.

It is to be appreciated that many variations and alternative methods of maintaining a universal time base can also be used in conjunction with the present invention. For instance, one variation of the present embodiment would be to have the host computer 158 communicate the universal time and average time delay in each test packet transmitted to the base station 154 in step 1064, rather than only transmitting this information once after calculating the delay associated with the 100 test packets. The base station 154 could then calculate and store the universal time associated with each test packet and calculate an average universal time at the end of the testing period. Alternatively, network time protocols such as that used in conjunction with synchronizing servers in the internet could also be modified for use with the present invention. More specifically, an internet time synchronization protocol described in the publicly available Request for Comments (RFC) 1129 could be used. Further, time synchronization could occur by having each mobile terminal 166 roaming in the network keep track of the difference in time clocks between each base stations 154 it registers with. The mobile terminal 166 could then pass the information along to the host computer 158 which could then update each base station 154 to one universal time selected by the host computer 158. Alternatively the host computer 158 could communicate with each base station 154 with respect to each base station's 154 internal timer rather than a universal clock since the host computer 158 knows the differences between each of the base station's 154 internal timers and the host computer's 158 clock. In systems having many roaming mobile terminals 166, such a method could be an efficient and accurate way of maintaining a central or universal time base.

Referring briefly to FIG. 12F, shown is the base station hopping sequence table which is maintained in memory by the host computer 158. As described above, the base station hopping sequence table includes the base station identification address, hopping sequence, hopping sequence start time, beacon interval and test pattern interval for all base stations 154, 156 which are registered in the system 150.

Figure 12G:
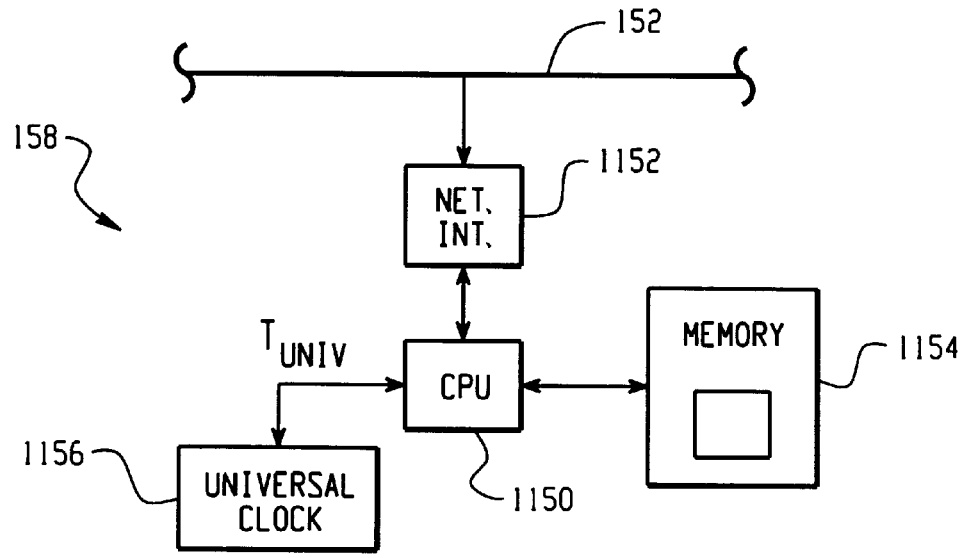
FIG. 12G is a block diagram of the host computer in accordance with the present invention.

Turning now to FIG. 12G, a block diagram of an exemplary host computer 158 is shown. The host computer 158 is conventional in the sense that it includes a central processing unit (CPU) 1150 connected to the system backbone 152 via a network interface 1152. The CPU 1150 is configured to be able to access the base stations 154, 156 via the system backbone 152 according to conventional techniques. Connected to the CPU 1150 is a memory 1154 including ROM and RAM for storing program code executed by the CPU 1150 for carrying out the functions described herein. In addition, the memory 1154 includes portions allocated for storing the contents of the base station hopping sequence table (FIG. 12F) as discussed herein, and for storing the contents of the time delay tables (FIG. 12E) formed during the registration of base stations.

The host computer 158 also includes a universal clock 1156 which serves as the universal clock time reference in the system 150 as will be appreciated in view of the preceding disclosure. The universal clock 1156 is made up of a 64-bit counter which is incremented once every 1 microsecond in the same manner as the clocks 179, 179' and 224 in the base stations and mobile terminals. The universal clock 1156 is set to 0 (i.e., all bits equal 0) upon the host computer 158 being powered up or reset. The universal clock 1156 then runs continuously. The output of the universal clock 1156 represents $T_{univ}$ referred to above, and is provided to the CPU 1150 for use in registering the base stations as discussed above. It will be appreciated that if the universal clock 1156 is reset, the various base stations and mobile terminals within the system 150 will need to be reset so that their registration procedure will be repeated.

Figure 13A:
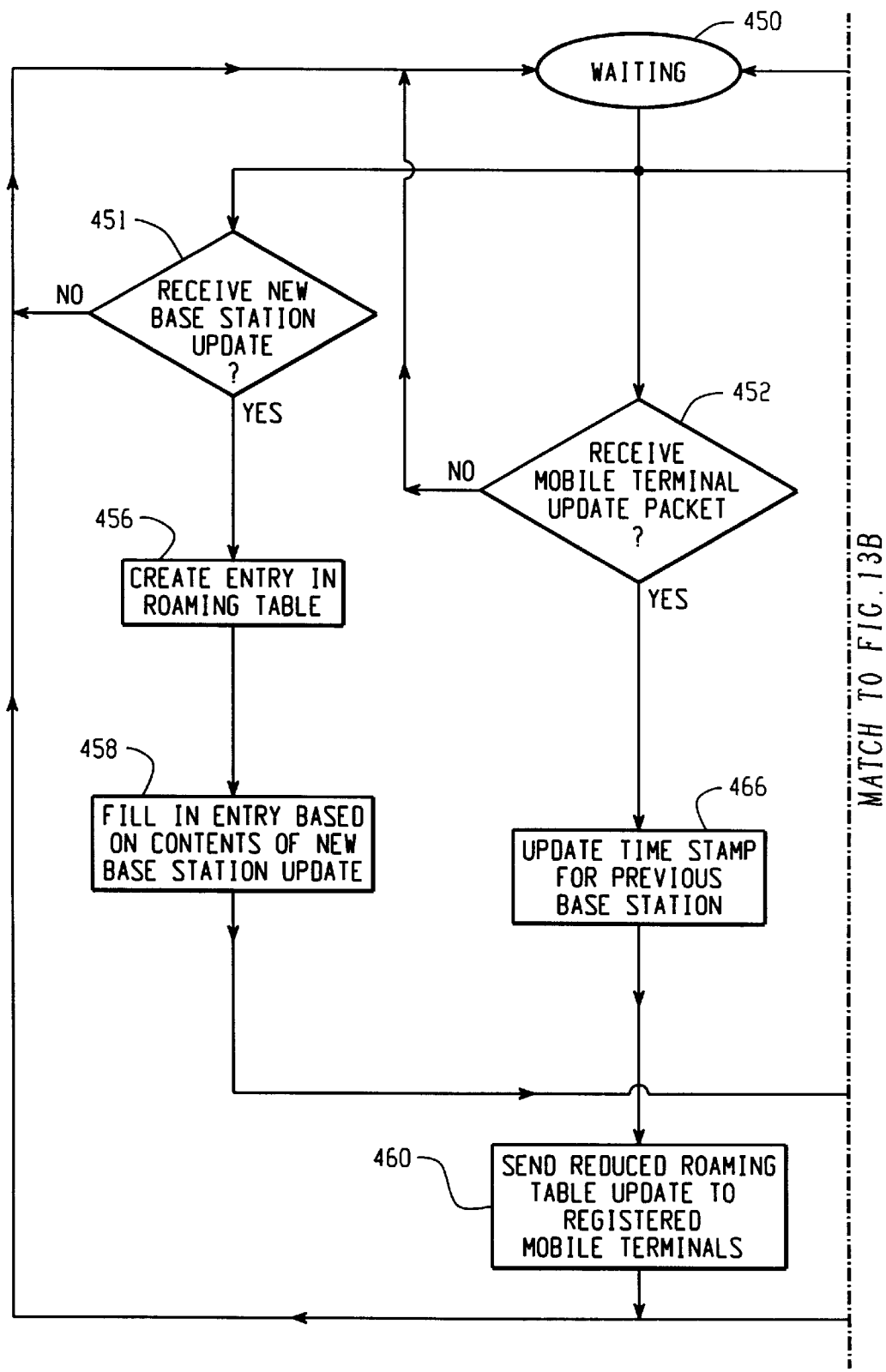
FIG. 13 is a flowchart representing the operation of a base station for maintaining the information stored in its roaming table in accordance with the present invention.
Figure 13B:
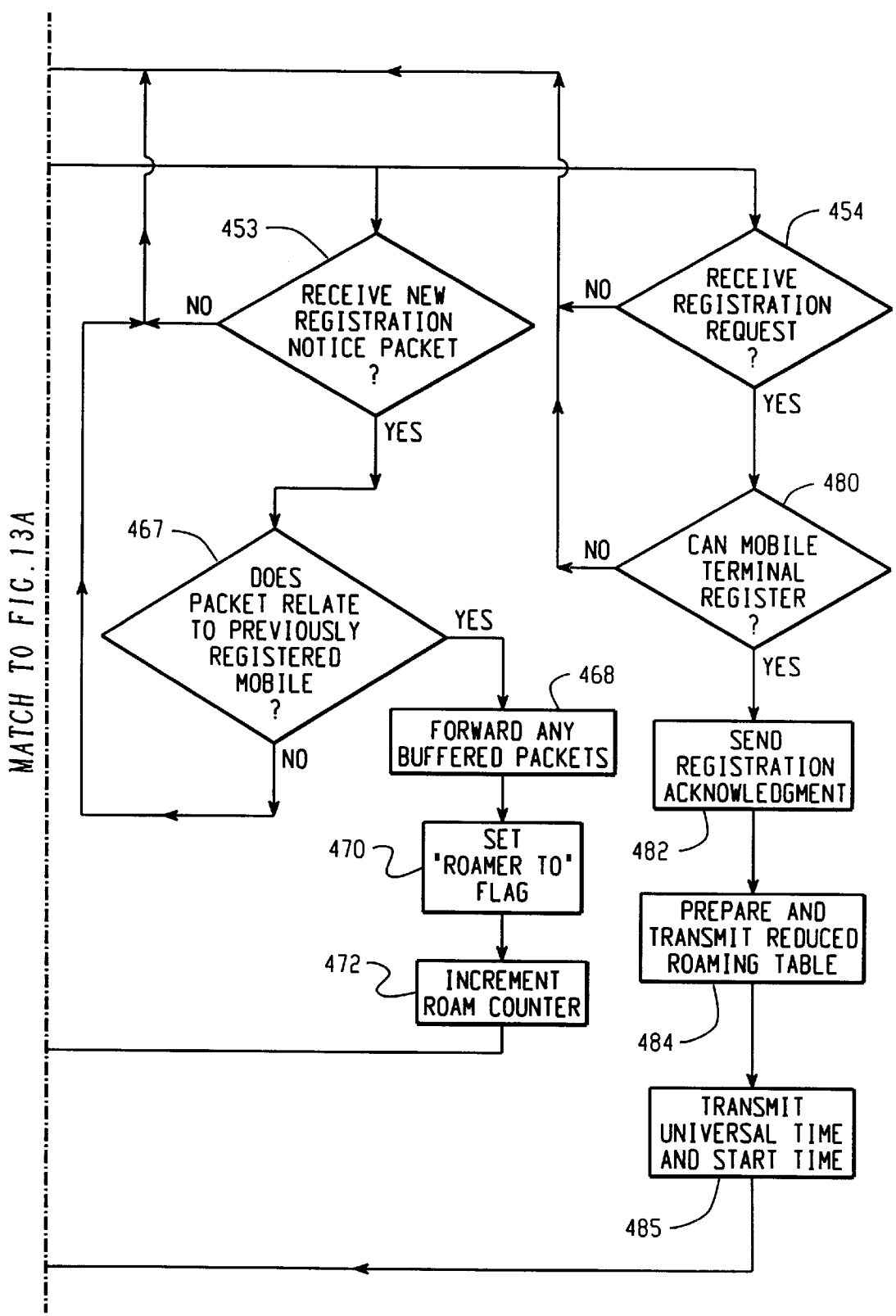

Turning now to FIG. 13, the general sequence of operations for each base station 154, 156 is shown in relation to roaming table operations. The processor 176, 176' in each base station 154, 156 is programmed to carry out the operations shown in FIG. 13 continuously as part of overall management operations while at the same time carrying out normal communications. The processor 176, 176' normally resides in step 450 waiting for an event to happen as determined in any of steps 451–454. For example, in step 451 the processor 176, 176' determines if a new base station update packet has been received indicating that a new base station 154, 156 has become part of the system as exemplified in step 1044 of FIG. 12B. If yes, the processor 176, 176' creates a new entry in its roaming table 296 as represented in step 456. Such entry is formed in a manner analogous to the creation of an entry as described with respect to step 1014 in FIG. 12A. Thereafter, the processor 176, 176' fills in the information for that entry in the roaming table 296 based on the information included in the new base station update packet provided by the host computer 158 as reflected in step 458.

The processor 176, 176' then proceeds to step 460 in which it causes a reduced roaming table update packet to be transmitted to some or all mobile terminals 166 registered to the base station 154, 156. Such packet updates any information which has changed. Thus, for example, if a new entry is created in steps 456 and 458, the update packet in step 460 will contain information allowing the registered mobile terminals 166 to create a corresponding entry in their reduced roaming table 320. In the preferred embodiment, however, such update packet is not sent to a registered mobile terminal 166 in step 460 unless the location of the new base station cell area is known to be in close proximity to the present base station's coverage area. Otherwise, registered mobile terminals 166 may update their reduced roaming tables 320 with entries corresponding to base stations which there is a small likelihood the mobile terminal 166 may encounter. Following step 460, the processor 176, 176' returns to step 450. If in step 451 no new base station registration packet is received, the processor 176, 176' also returns to step 450.

In step 452 the processor 176, 176' determines whether a mobile terminal update packet is received from a registered mobile terminal 166. As is explained below in connection with FIG. 15, a mobile terminal 166 which newly registers with a base station 154, 156 transmits a mobile terminal update packet to the new base station 154, 156 which includes current hopping sequence timing information and test pattern information for the base station 154, 156 with which the mobile terminal 166 was previously registered. Since the mobile terminal 166 was, as of just recently, locked onto the hopping sequence of the base station with which it was previously registered, the mobile terminal 166 can provide timing information which is considered more up to date and hence is used to update the roaming table of the new base station 154, 156. The mobile terminal update packet includes in its data field 254 current time stamp information regarding the particular start time of the previous base station 154, 156 at the time the mobile terminal update packet is transmitted. Such information is similar to the above mentioned time stamp 284 and is combined with information identifying the previous base station in the format [previous base station ID; start time], for example. The start time was received by the mobile terminal 166 from the previous base station 154, 156 and stored when it previously registered with the base station (see step 635 in FIG. 15). In particular, it is the start time information which is updated in field 304 of table 296 since delays, clock variations, or the like may have caused the start time value to be off slightly. In this way, the system 150 will tend to converge upon itself with respect to identical timing as the mobile terminals 166 roam about.

In the event a mobile terminal update packet is received in step 452, the processor 176, 176' proceeds to step 466 in which the processor 176, 176' updates the time stamp in its roaming table for the specified base station based on the information in the mobile terminal update packet. Specifically, the processor 176, 176' takes the [start time] information from the mobile terminal update packet and replaces the previous time stamp 304 information therewith.

Following step 466, the processor 176; 176' is programmed to broadcast in step 460 the updated time stamp (start time) information obtained in step 466 to any mobile terminal 166 capable of receiving information transmitted from the current base station 154, 156. The mobile terminals 166 receiving such information are in turn programmed to disregard information pertaining to a base station not included in its reduced roaming table 320. The mobile terminals 166 are programmed then to update the information in their reduced roaming table 320 based on the update packet. Again following step 460, the processor 176, 176' returns to step 450. Also, in the event a mobile terminal update packet is not received in step 452, the processor 176, 176' returns to step 450.

In step 453, the processor 176, 176' determines if a new registration notice packet has been received in relation to a mobile terminal 166 which either was registered or is currently registered with the base station 154, 156 indicating that the particular mobile terminal 166 has now registered with a new base station 154, 156. As is conventional, the new base station 154, 156 is programmed to broadcast the registration notice packet on the system backbone 152 to all other base stations 154, 156 in the network. The registration notice packet includes in its data field 254 an indication of which particular base station 154, 156 the mobile terminal 166 has newly registered with. Based upon receiving the new registration notice packet, the base station 154, 156 with which the mobile terminal 166 was previously registered to will clear its registration table of the mobile terminal 166, thereby indicating that the mobile terminal 166 has deregistered with the base station 154, 156. In the event a registration notice packet is received in step 453, the processor 176, 176' proceeds to step 467. In step 467 the processor 154, 156 determines whether the registration notice packet contains new registration information related to a mobile terminal 166 which was previously registered to the base station 154, 156. If in step 467 it is determined that the new registration notice packet does not contain information related to a mobile terminal previously registered to the base station 154, 156, the processor 176, 176' proceeds back to step 450. If it does, the processor 176, 176' proceeds to step 468 in which it forwards via the system backbone 152 any packets which it may have buffered in memory due to the deregistering mobile terminal 166 having gone "off-line". As is conventional, when a mobile terminal 166 looks for another base station to register with, the mobile terminal may instruct the base station with which it is currently registered to buffer any packets directed to the mobile terminal 166 and received by the base station. In the event packets have been buffered, the processor 176, 176' forwards them to the new base station with which the mobile terminal is newly registered. The new base station 156, 156 then transmits the packets to the mobile terminal 166.

Following step 468, the processor 176, 176 in step 470 sets the flag in the roamed to indicator 310 in the roaming table 296 corresponding to the base station to which the mobile terminal 166 roamed. Furthermore, a time stamp relating to the roamed to indicator 310 being set is also maintained in memory so that it may be cleared again if no further roaming occurs in a twenty-four hour period. Following step 470 the processor 176, 176' proceeds to step 472 in which it increments by one the value of the roam counter 312 in its roaming table 296 for the base station entry corresponding to the base station to which the mobile terminal 166 roamed and similarly starts a time in memory corresponding to when the incrementation occurred. Next, the processor 176, 176' proceeds to step 460 again and transmits a reduced roaming table update packet to those mobile terminals 166 which include in their reduced roaming table 320 the base station to which the mobile terminal had roamed. The reduced roaming table update packet in this case includes in its data field 254 the updated value of the roam counter 312 for that particular base station. The mobile terminals 166 are programmed to update the contents of their corresponding reduced roaming tables 320 as discussed below in relation to FIG. 15. After step 460, the processor 176, 176' returns to step 450. Similarly, in the event a registration notice packet is not received as determined in step 453, the processor 176, 176' returns to step 450.

Step 454 calls for the processor 176, 176' to determine if a registration request packet has been received from a mobile terminal 166. As described below with respect to FIG. 15, a mobile terminal 166 which wishes to register with a new base station 154, 156 transmits to that base station 154, 156 a registration request packet seeking registration. In the event such a packet is received in step 454, the processor 176, 176' proceeds to step 480 in which it determines whether the mobile terminal 166 sending the request is permitted to register. For example, if the base station 154, 156 is currently servicing a maximum number of mobile terminals, the processor 176, 176' may communicate back to the requesting mobile terminal that registration is not permitted. If for some reason registration is not permitted as determined in step 480, the processor 176, 176' ignores the registration request and returns to step 450. On the other hand, if the processor 176, 176' determines registration is to be permitted, the processor causes a registration acknowledgment packet to be transmitted to the requesting mobile terminal 166 as represented in step 482.

Following step 482, the processor 176, 176' in step 484 constructs a reduced roaming table packet to be transmitted to the mobile terminal 166 which has just been registered. The reduced roaming table information within the packet includes the base station entries from the roaming table 296 which, according to the predefined criteria described herein, are considered to be likely candidates for registration in the event the mobile terminal 166 later roams to another cell. Such reduced roaming table information is utilized by the newly registered mobile terminal 166 to construct a new reduced roaming table 320 as discussed above. The manner in which the reduced roaming table information is formed by the processor 176, 176' is described in more detail in relation to FIG. 14. After the reduced roaming table packet is formed, the processor 176, 176' causes the packet to be transmitted to the mobile terminal 166 in step 484. Following step 484, the processor 176, 176' proceeds to step 485 in which it transmits to the newly registered mobile terminal 166 the precise universal clock time as determined by the clock 179, 179', and the "start time" of the base station which is stored therein. The mobile terminal 166 may already have such information in its reduced roaming table 320, depending on where the mobile terminal 166 has been previously or whether the mobile terminal 166 has only recently powered up and/or has been reset so as to have an empty reduced roaming table 320. Nevertheless, the start time and universal clock time provided by the new base station 154, 156 in step 485 is used to update the corresponding entry in the mobile terminal reduced roaming table 320. In addition, the mobile terminal 166 uses the universal clock time provided by the base station 154, 156 to set/reset its own clock 224 to the universal clock time (steps 606 and 635 in FIG. 15). After step 485, the processor 176, 176' returns to step 450. Similarly, if a registration packet is not received as determined in step 454, the processor 176, 176' returns to step 450.

Figure 14:
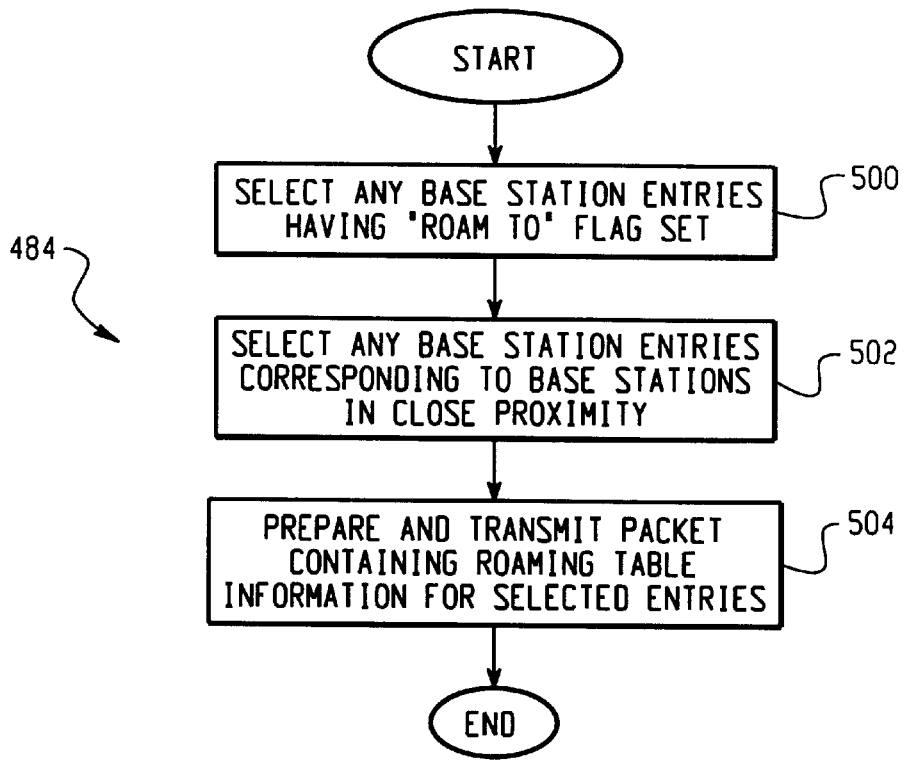
FIG. 14 is a flowchart representing the operation of a base station for constructing and transmitting the contents of a reduced roaming table in accordance with the present invention.

Turning now to FIG. 14, the process in which each base station 154, 156 generates reduced roaming table information for the reduced roaming table packet is shown, such process being carried out in step 484 as discussed above. Beginning in step 500, the processor 176, 176' in the base station 154, 156 checks the contents of its roaming table 296 stored in the memory 178, 178' to see if there are any base station entries which have the flag set in the roam to/from indicator 310. If so, those base station entries are selected by the processor 176, 176'. Next, in step 502 the processor 176, 176' is programmed to select any base station entries from the roaming table 296 which correspond to a base station which is known to be in close proximity of the current base station. For example, each base station 154, 156 may be preprogrammed to have a network "map" in memory which is indicative of the relative locations of known base stations on the network.

Accordingly, the processor 176, 176' is programmed to look at the network addresses in the base station identification 300 and to select under a predetermined criteria any additional base stations which are in close proximity. As previously indicated, those base stations in close proximity are considered more likely to represent a new base station to which a registered mobile terminal 166 may eventually roam. Following step 502, the processor 176, 176' proceeds to step 504 in which it constructs and transmits via the RF section 180, 180' the reduced roaming table information packet including the information corresponding to the selected base stations.

Figure 15A:
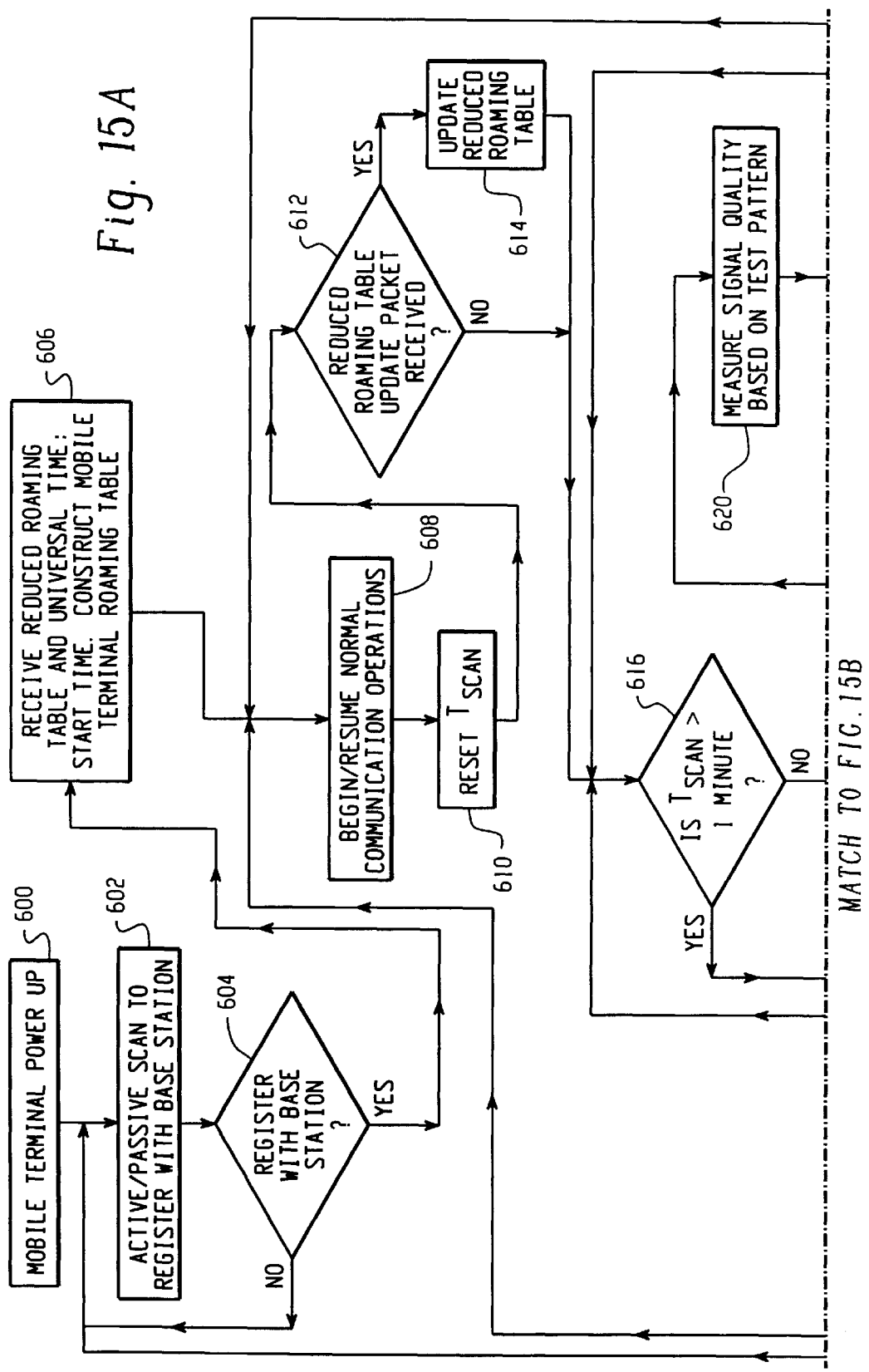
FIG. 15 is a flowchart representing the operation of a mobile terminal with respect to registering with different base stations such as when roaming from cell to cell in accordance with the present invention.
Figure 15B:
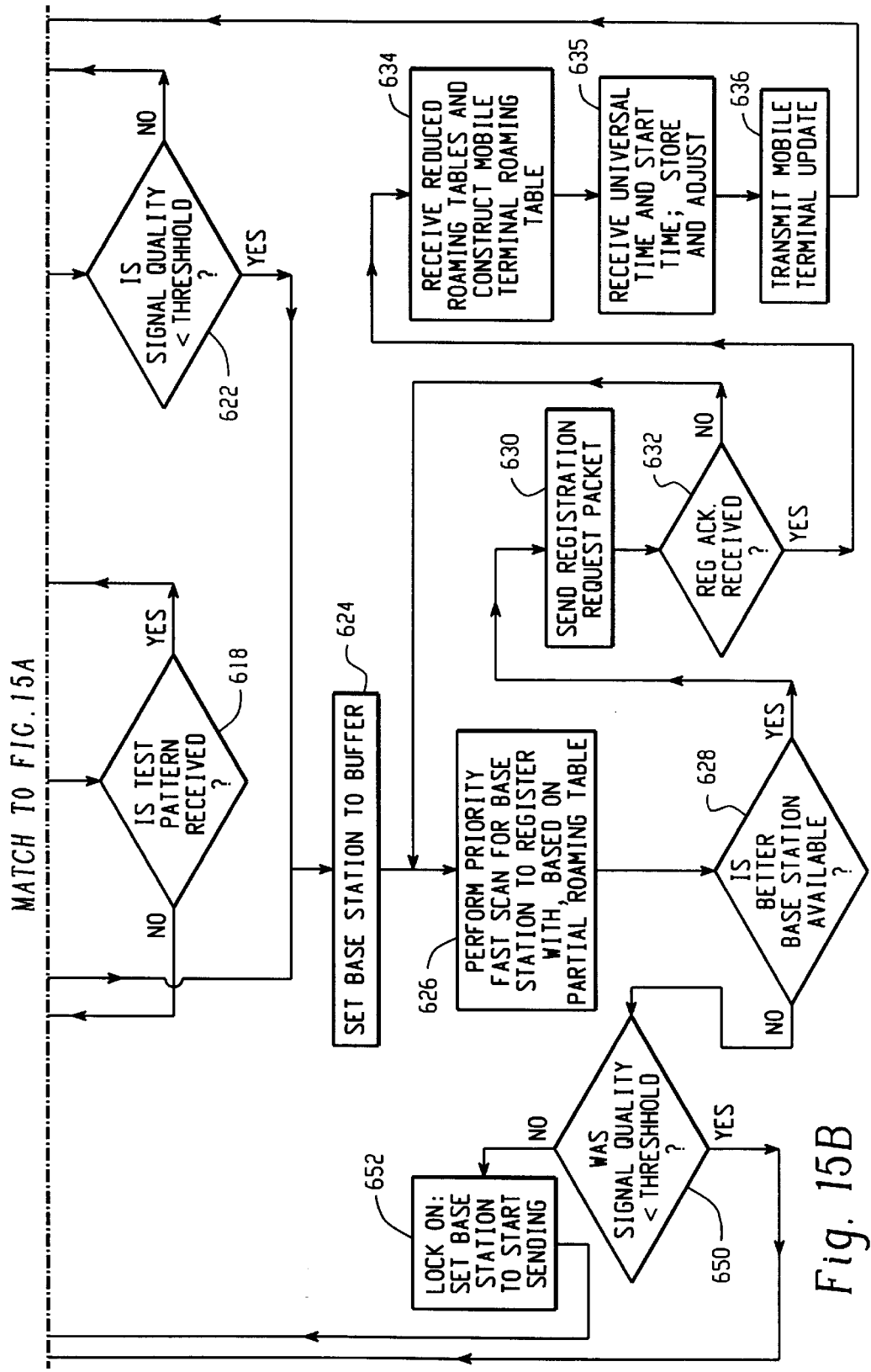

FIG. 15 represents the operation of each mobile terminal 166 with respect to registering with different base stations when, for example, roaming from cell to cell in accordance with the invention. Step 600 represents when the mobile terminal 166 is initially powered up (e.g., the mobile terminal 166 is turned "on" via a switch). Alternatively, the mobile terminal 166 may be powered up in the sense that it is reset in step 600. In step 600, the mobile terminal 166 goes through any conventional self-initialization routines and the like. Following step 600, the processor 200 in the mobile terminal 166 proceeds to step 602 in which it attempts to register the mobile terminal with a base station 154, 156 using conventional active or passive scanning techniques. As will be appreciated, mobile terminals 166 which are first introduced into the system 150 will not have immediate access to any roaming table 296. Therefore, the mobile terminal 166 initially attempts to lock-on to a hopping sequence of a nearby base station 154, 156 using conventional techniques. For example, in step 602 the processor 200 may carry out the active scan technique discussed above in relation to FIG. 1. Alternatively, the processor 200 may utilize the conventional passive scan technique described above in connection with FIG. 2.

After the mobile terminal 166 locks-on to the hopping sequence of one of the base stations 154, 156 in step 602, the processor 200 proceeds to step 604 in which it attempts to register the mobile terminal 166 with the particular base station 154, 156 with which it has just locked on. The processor 200 attempts to register with the base station 154, 156 using known protocols such as those described in U.S. Pat. No. 5,276,680, assigned to Telesystems SLW Inc. Such protocols include transmission of a registration request packet as per step 454 in FIG. 13, and receipt of a registration confirmation as per step 482 in FIG. 13. If the mobile terminal 166 is successfully registered with a base station 154, 156 in step 604, the processor 200 proceeds to step 606. Otherwise, the processor 200 returns to step 602 and again attempts to lock on to the hopping sequence of a base station 154, 156.

In step 606, the processor 200 receives via the RF section 212 the reduced roaming table information packet which is sent by the base station 154, 156 with which the mobile terminal 166 is registered therewith as represented in step 484 of FIG. 13. The processor 200 is programmed to proceed to construct a reduced roaming table 320 in the memory 210 based on the reduced roaming table information provided from the base station in the manner described above. In other words, the processor 200 enters the corresponding hopping sequence information 302, time stamp 304, optional beacon interval 306 and test pattern interval 308, and roam counter 312 information for the selected base station entries into the reduced roaming table 320. Also in step 606 the processor 200 receives the universal clock time and start time from the base station 154, 156 with which it is registered. The processor 200 stores the start time in memory and immediately sets the clock 224 to the universal clock time upon receipt of such information. Since the mobile terminal 166 will already be locked-on to the hoping sequence of the base station 154, 156 with which it registered it is unnecessary for the mobile terminal 166 to compute exactly where in the hoping sequence the base station is based on the universal clock time and start time as discussed below. Furthermore, in step 606 the processor 200 starts maintaining the last scanned timers 324 for each of the entries in the reduced roaming table 320.

Following step 606, the processor 200 in step 608 controls the mobile terminal 166 so as to begin/resume normal communications within the system. In other words, the mobile terminal 166 performs whatever functions are intended with respect to communicating data to the system backbone 152 via the particular base station 154, 156 with which it is registered. At the same time the mobile terminal 166 is performing such operations, however, the processor 200 continues to execute the operations shown in FIG. 15. More specifically, following step 608 the processor 200 proceeds to step 610 in which it resets an internal continuous timer $T_{scan}$ (not shown) to zero. Next, in step 612 the processor 200 determines if a reduced roaming table update packet has been received via the RF section 212. As discussed above in relation to step 460 in FIG. 13, the base station 154, 156 with which the mobile terminal 166 is registered will send the mobile terminal 166 a reduced roaming table update packet in the event relevant updated information has been received by the base station. If the mobile terminal 166 has received a reduced roaming table update packet in step 412, the processor 200 goes to step 614 in which it updates the reduced roaming table 320 based on the updated information. Following step 614, the processor 200 proceeds to step 616. On the other hand, if a reduced roaming table update packet is not received as determined in step 612, the processor 200 proceeds directly to step 616.

In the exemplary embodiment, it is desirable that mobile terminals 166 attempt to lock-on to the hopping sequence of a new base station 154, 156 in the event the signal quality between the mobile terminal 166 and its current base station deteriorates (due to roaming to another cell, for example). In addition, however, it is desirable that the mobile terminals 166 periodically check for registration with another base station 154, 156 which may provide an improved communication link. Therefore, in step 616 the processor 200 determines whether the timer $T_{scan}$ has reached a predetermined time period since last being reset in step 610. For example, in the preferred embodiment it is desirable that the mobile terminals 166 check at least every minute for registration with another base station. Consequently, in step 616 the processor 200 determines whether $T_{scan}$ is greater than one minute (although some other period is certainly within the scope of the invention). If not, the processor 200 proceeds to step 618 in which it determines whether a test packet has been received from the base station 154, 156 with which the mobile terminal is registered. If no, the processor 200 returns to step 616. As a result, during the time the mobile terminal 166 is performing its conventional functions within the system 150 the processor 200 is constantly monitoring in steps 616 and 618 whether a test packet has been received or a minute has passed since the mobile terminal 166 last attempted to register with another base station.

As the mobile terminal 166 begins to roam from one cell 162 (FIG. 3) to another, the signal quality between the mobile terminal 166 and the base station to which it is registered will begin to deteriorate. If a test pattern is received in step 618, the processor 200 goes to step 620 in which the mobile terminal 166 determines the signal quality based on the test pattern according to conventional techniques. If the signal quality is equal to or greater than a predefined threshold as determined in step 622 the processor 200 returns to step 616. However, if the signal quality is less than a predetermined threshold in step 622 due to, for example, the mobile terminal 166 roaming to another cell, interference, signal obstructions, etc., as determined in step 622 the processor 200 proceeds to step 624 Similarly, if $T_{scan}$ is greater than one minute in step 616 the processor proceeds to step 624.

In step 624 the processor 200 begins the process of scanning for a new base station 154, 156 which may provide a better communication link with the system backbone. Specifically, the processor 200 in step 624 causes the mobile terminal 166 to transmit a packet to the current base station 154, 156 indicating that the mobile terminal 166 is going "off-line" temporarily. For example, in conventional cellular systems the mobile terminal 166 may go into a power savings "sleep" mode during idle periods. Since the mobile terminal 166 will not be fully powered to receive packets transmitted from the base station 154, 156, the base station temporarily stores or buffers the packets intended to be sent to the mobile terminal during such time. In order to know when the mobile terminal 166 is going into a sleep mode or is otherwise unavailable to receive packages, the mobile terminal 166 transmits a packet to the base station indicating that it is going "off-line". Thus, when the base station 154, 156 receives the packet sent from the mobile terminal in step 624 the base station is programmed to begin buffering any packets it receives that are destined for the mobile terminal.

Following step 624, the processor 200 proceeds to step 626 in which it performs what is referred to herein as a priority fast scan as is discussed in more detail below in connection with FIGS. 16 and 17. As generally described above, the priority fast scan involves using the contents of the reduced roaming table 320 to scan and lock on quickly to one or more base stations 154, 156 which may provide a better communication link with the mobile terminal 166. This enables the mobile terminal 166 which may be roaming from one cell 162 to another to lock on quickly to the base station 154, 156 covering the new cell. Based on the hopping sequence, time stamp (start time), beacon interval information, universal clock time, etc. stored in the reduced roaming table 320, the mobile terminal 166 is able to jump directly to the hopping sequence and particular channel where a base station is expected to be at the present time. During the priority fast scan in step 626, the processor 200 identifies the availability of a base station which provides a better signal (i.e., a better communications link) as further explained below.

After performing the priority fast scan in step 626, the processor 200 goes to step 628 in which it determines if a base station 154, 156 providing a better signal than the current base station was identified in step 626. If yes, the processor 200 proceeds to step 630 in which, having locked on to the hopping sequence of the identified base station 154, 156 in step 626, the processor 200 causes a registration request packet to be transmitted to the identified base station. As discussed above in relation to steps 454, 480 and 482 in FIG. 13, the new base station 154, 156 having received such a registration request packet will respond with a registration acknowledgment packet provided the mobile terminal 166 is permitted to register. Accordingly, in step 632 the processor 200 is programmed to determine if a registration acknowledgment packet has been received in response to the registration request packet transmitted in step 630. If not, the processor 200 returns to step 626 in which it performs the priority fast scan in an attempt to identify another suitable base station.

If a registration acknowledgment packet is received in step 632 the processor 200 then proceeds in step 634 to receive and process the reduced roaming table information received from the new base station 154, 156. As described above in connection with step 484 in FIG. 13, the base stations are programmed to transmit a reduced roaming table information packet to a newly registered mobile terminal 166. The processor 200 receives such packet in step 634 and proceeds to construct a new reduced roaming table 320 in the manner set forth above.

Next, in step 635 the mobile terminal 166 receives the start time and universal clock time provided by the base station 154, 156 (step 485) and immediately sets its clock 224 to the universal clock time. Although ideally the clock 224 is already set at that particular universal clock time at this point (since it is intended to be universal throughout the system 150), there may be a slight variation due to slight variations in the various clocks 179, 179', 240 and 1156. Thus, the mobile terminal 166 takes the opportunity to synchronize its clock 240 with the universal clock time of the base station clock 179, 179' which will tend to be the more accurate of the two. The mobile terminal 166 also proceeds to store the particular start time of the base station 154, 156 for use in a future mobile terminal update.

Following step 635, in step 636 the processor 200 transmits to the new base station 154, 156 the aforementioned mobile terminal update packet (step 452 in FIG. 13). As discussed above, the mobile terminal update packet includes the particular time stamp (start time) 304 for the previous base station with which the mobile terminal 166 was registered.

Following step 636 the processor 200 returns to step 608 where it begins routine communications again in accordance with the particular system requirements. As is discussed above in relation to FIG. 13, upon the mobile terminal 166 registering with the new base station 154, 156, the new base station 154, 156 is programmed to broadcast the registration notice packet to the base station 154, 156 with which the mobile terminal 166 was previously registered. As a result, the previous base station 154, 156 can forward any buffered packets and update its roaming table 296 in the manner described above with respect to steps 468, 470, and 472.

If in step 628 the processor 200 concludes that a better base station signal is not available based on the priority fast scan in step 626, the processor proceeds to step 650. In step 650 the processor 200 ascertains whether or not the most recent time the signal quality with the current base station 154, 156 was evaluated (based on the test pattern signal) the signal quality was below the aforementioned predetermined threshold. For example, it is possible that the processor 200 reaches step 650 due to the above discussed periodic scan for other base stations rather than a deterioration of signal quality. If the signal quality was not below the predetermined threshold, the service provided by the current base station 154, 156 is considered sufficient and the processor 200 proceeds to step 652. In step 652 the processor 200 again locks-on to the current base station 154, 156 using known techniques. In particular, the processor 200 knows the precise timing of the current base station 154, 156 for the same reasons discussed above in connection with transmitting the mobile terminal update packet in step 636. Hence, the processor 200 can quickly compute exactly where the current base station 154, 156 is in its hopping sequence and then lock-on accordingly using the same techniques exemplified in FIGS. 18 and 19 discussed below. Upon locking on, the mobile terminal 166 transmits a notification packet to the base station 154, 156 in step 652 informing the base station that the mobile terminal 166 is back "on line". Accordingly, the base station will know to begin sending packets again to the mobile terminal 166. The processor 200 then returns from step 652 back to step 608 in which normal operations are resumed.

If in step 650 it is determined that the signal quality with the current base station was not above the predetermined threshold, it is concluded that the priority fast scan did not result in a suitable base station and a base station 154, 156 with suitable signal quality still has to be found. Accordingly, the processor 200 returns back to step 602 in which a conventional active or passive scan is conducted. Since the reduced roaming table 320 in the mobile terminal 166 most likely did not include all base stations within the system 150 for purposes of efficiency, there may be other base stations that can be located as a result of a conventional scan.

Figure 16A:
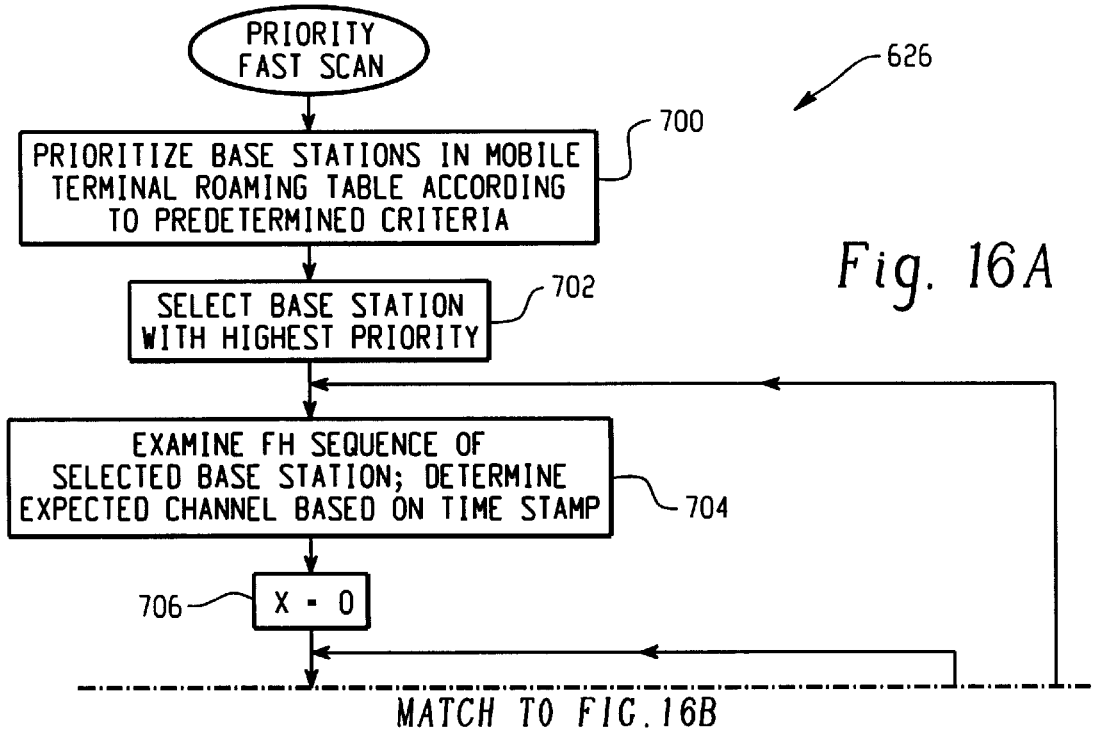
FIG. 16 is a flowchart representing a priority fast scan routine executed by a mobile terminal when attempting to register with a new base station in accordance with the present invention.
Figure 17:
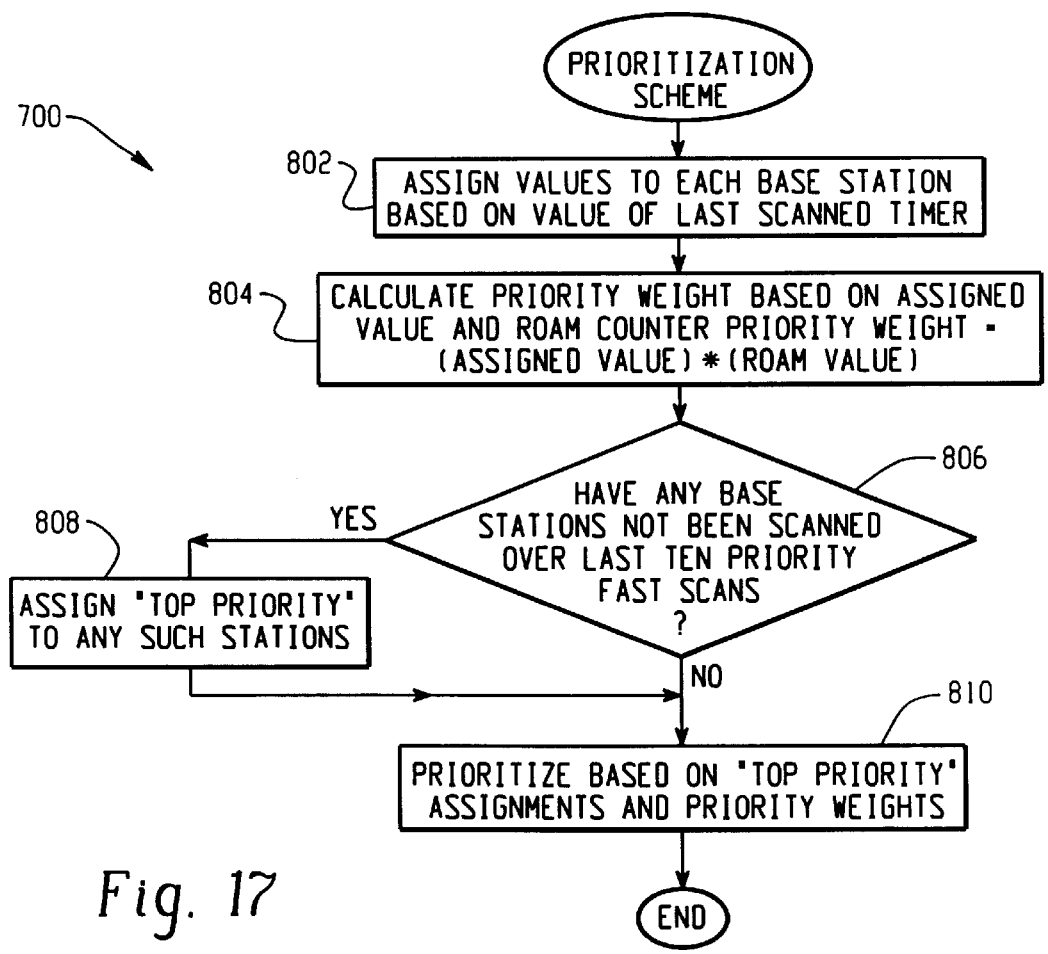
FIG. 17 is a flowchart representing a prioritization scheme for prioritizing the order in which a mobile terminal should attempt to register with the base stations in the reduced roaming table in accordance with the present invention.
Figure 16B:
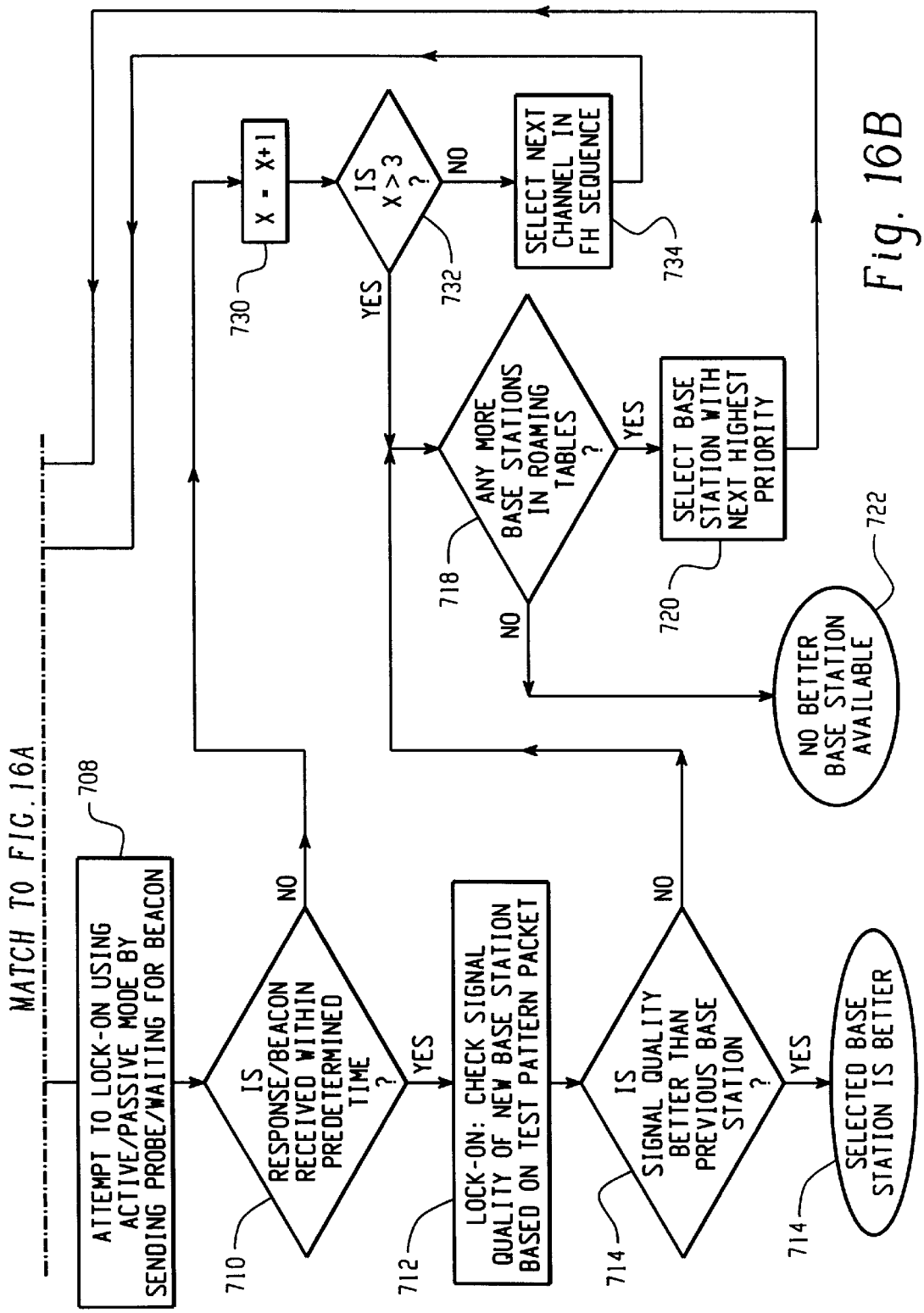

Referring now to FIG. 16, the priority fast scan routine referred to in step 626 of FIG. 15 is shown in more detail. The priority fast scan is performed by each mobile terminal 166 based on the information stored in its respective reduced roaming table 320. Beginning in step 700, the processor 200 analyzes the entries included in the reduced roaming table 320 according to a predetermined criteria so as to prioritize the entries in the order in which the processor 200 will attempt to lock onto the respective base stations 154, 156. FIG. 17 discussed below gives one example of such a prioritization scheme, although many different schemes can be utilized.

Following step 700, the processor 200 continues to step 702 in which it selects the base station having the highest priority in the reduced roaming table 320 as determined in step 700. Next, in step 704 the processor 200 determines the particular hopping sequence utilized by the selected base station based on the information stored in the sequence information 302. Specifically, the processor 200 obtains the hopping sequence section and pattern from the sequence information 302 stored in the roaming table for the selected base station. Based on the set and pattern, the processor 200 is programmed to look to the frequency hopping sequence table (FIG. 7) maintained in the memory 210 and determine the exact hopping sequence utilized by the selected base station. For example, suppose the sequence information 302 for the selected base station was [set;pattern] equal to [2;B] as represented in FIG. 7. The processor 200 would look to the frequency hopping table maintained in memory 210 and determine that the selected base station was utilizing the frequency hopping sequence $f_{2,B}$, where $f_{2,B}$ is made up of a sequence of seventy-nine channels represented, in time sequence order, by $f_{2,B,1}, f_{2,B,2}, \ldots, f_{2,B,79}$.

Next in step 704, the processor 200 calculates exactly where in its hopping sequence the selected base station 154, 156 should be based on the corresponding time stamp (start time) 304 stored in the roaming table 320 and the current universal clock time as determined by the output from the mobile terminal clock 224. Specifically, the precise location of the base station 154, 156 in its hopping sequence is calculated as follows:

Let $x$=([current universal clock time]–[start time]) mod ([no. of hops per sequence]×[dwell time])

where mod represents the modulo function; [current universal clock time] represents to output of the clock 224 at the present time; [start time] represents the time at which the base station 154, 156 started its hoping sequence (as determined from time stamp field 304 in the reduced roaming table 320); [no. of hops per sequence] represents the number of hops in the sequence utilized by the particular base station (in the exemplary embodiment, all sequences have 79 hops); and [dwell time] represents the dwell time of each hop in the sequence (in the exemplary embodiment, all dwell times are 100 milliseconds). Although in the exemplary embodiment the number of hops is the same in all possible sequences as are the dwell times, different number of hops and dwell times can be utilized as will be appreciated. In such an embodiment, the frequency hopping sequence table stored in each mobile terminal and base station will include such information for each particular sequence.

The equation for x above determines how far (with respect to time) the base station is into its current cycle through its hopping sequence. Next, let $y = x$ mod [dwell time], $z$=integer ($x$/[dwell time])

such that y represents precisely how far (with respect to time) the base station is into its current hop; and z represents the integer portion of x divided by the [dwell time], or the number of the particular hop (e.g. 1 through 79) at which the base station is currently at in its hopping sequence. Thus, by calculating z and y, the processor 200 determines the exact expected location of the base station in its hopping sequence in step 704. It will be appreciated that the calculation performed by the processor 200 (as well as the other processors herein) are performed at a sufficiently high speed as to have a negligible affect in the determination of the hopping sequence locations.

The processor 200 in step 704 then attempts to synchronize the hopping sequence of the mobile terminal 166 itself to that of the selected base station, to the extent possible, based on the expected location of the base station in the same hopping sequence. More specifically, the processor 200 configures the RF section 212 in the mobile terminal 166 to hop according to the hopping sequence of the selected base station 154, 156. Even more specifically the processor 200 causes the RF section 212 to begin hopping at the particular channel number in the hopping sequence which the selected base station is expected to be at currently as determined in the above equations. Thus, using the above example where the selected base station 154, 156 is using the hopping sequence $f_{2,B}$, suppose the expected channel number is 34 (as determined by z) based on the time stamp 304 stored in the reduced roaming table. Consequently, the processor 200 would cause the FH sequence modulator 220 to jump immediately to the channel $f_{2,B,34}$ in the hopping sequence $f_{2,B}$, and proceed from there through the hopping sequence.

In the above described embodiment the processor 200 also calculates the precise dwell time (as determined by y) in the channel that the selected base station is expected to be at as set forth in the above equations. Accordingly, the processor 200 further causes the FH sequence modulator 220 to jump immediately to the expected dwell time location in the expected channel (e.g., channel $f_{2,B,34}$) and proceed from there. Thus, in step 704 the processor 200 configures the mobile terminal 166 for the same hopping sequence as the selected base station 154, 156 at approximately the same point in the hopping sequence.

Although minimized by the present invention, the degree of correlation between the hopping sequence of the mobile terminal 166 and the selected base station 154, 156 in step 704 may not be exact because there may have been some propagation delays associated with exchanging universal clock time information over the system backbone 152 and/or between the mobile terminals and base stations. Consequently, the selected base station 154, 156 may be slightly further ahead in its hopping sequence than is indicated in the time stamp 304 used by the processor 200. Nevertheless, the invention is able to compensate for such offset by rapidly advancing through the next few channels in the hopping sequence in an effort to "catch up" to the base station 154, 156 as discussed below.

Specifically, following step 704 the hopping sequence of the mobile terminal 166 is perhaps only approximately in synchronization with hopping sequence of the selected base station 154, 156 (e.g., within a channel or two). Next, the mobile terminal 166 attempts to synchronize fully, i.e., "lock-on" to the hopping sequence of the selected base station using either active or passive scanning. First, however, following step 704 the processor 200 in step 706 sets a counter variable x equal to zero. Thereafter, the processor 200 in step 708 attempts to lock-on to the selected base station 154, 156 using either active or passive scanning by sending a probe packet or waiting for a beacon packet, respectively. In theory the selected base station will currently be at the same point in the hopping sequence as the mobile terminal 166. Thus, for example, if the mobile terminal 166 uses an active mode and sends out a probe packet on a given channel in the hopping sequence, the base station will receive and respond to the probe packet. Alternatively, if the mobile terminal 166 uses a passive scanning mode the mobile terminal will receive a beacon transmitted by the selected base station since they are both on the same channel.

As a result, there is a significant time savings in attempting to lock-on since the mobile terminal need not scan essentially randomly through the possible channels within the system 150 waiting to receive a probe response or a beacon packet. Nevertheless, there is the aforementioned possibility that due to propagation delays, clock skews or the like the selected base station 154, 156 is slightly ahead of the mobile terminal 166 in the hopping sequence. Accordingly, in step 708 the processor 200 causes the mobile terminal 166 to transmit a probe packet (in the event active mode scanning is utilized) or listens for a beacon packet (in the event passive mode scanning is utilized) on the channel at which the selected base station is expected to be a such time. Next, in step 710 the processor 200 determines if a probe response packet or beacon (depending on whether active or passive mode scanning is utilized) is received within a predetermined time following the sending of the probe packet or upon first beginning to listen for the beacon packet. For example, if using an active scanning mode the processor 200 may wait approximately 6 msec in step 710 to determine if a probe response packet is received from the selected base station. Such predetermined time (e.g., 6 msec) is preferably much shorter than the overall channel dwell time (e.g., 100 msec), but is long enough for the selected base station to respond in the event it received the probe packet. If using a passive scanning technique, the processor 200 is programmed to wait approximately 50 msec, for example, to receive a beacon from the selected base station. Again, such predetermined time (e.g., 50 msec) is substantially shorter than the overall channel dwell time in the given example, but is likely to encounter one of the beacons transmitted by the selected base station if the base station and mobile terminal are truly on the same channel. The processor 200 also analyzes the source address of the probe response packet or beacon to ensure the received packet originated from the base station it is attempting to lock-on to. The processor 200 discards the packet if it is not from the expected device and handles the situation as though no packet was received.

If in step 710 a probe response packet or beacon packet is received by the mobile terminal 166 within the predetermined time from the device to which the mobile terminal 166 is attempting to lock-on to, the processor 200 proceeds to step 712. In step 712, the mobile terminal 166 literally locks-on to the hopping sequence of the selected base station based on the contents of the probe response packet or beacon packet using conventional techniques. Upon locking on in step 712, the processor 200 waits to receive the next test pattern packet which is transmitted by the selected base station 154, 156. Then, using known techniques the particulars of which are not important to the invention, the processor 200 determines the signal quality of the link between the mobile terminal 166 and the selected base station based on the test pattern packet. Following step 712, the processor 200 in step 714 determines whether the signal quality is better than the signal quality provided by the previous base station as last determined in step 620 of FIG. 15. If the selected base station 154, 156 does provide better signal quality than the previous base station as determined in step 714, the processor 200 concludes in step 716 that the selected base station 154, 156 is "better". Hence, back in step 628 of FIG. 15 the processor 200 will conclude that a better base station is available and the mobile terminal 166 will proceed to step 630 and register with the base station 154, 156 with which it is already locked onto with respect to its hopping sequence.

If in step 714 the processor 200 determines that the signal quality provided by the selected base station 154, 156 is not better than that provided by the previous base station, the processor 200 proceeds to step 718. The processor 200 in step 718 determines whether there are any more base stations included in the reduced roaming table 320 with which the mobile terminal 166 has not yet tried to lock onto since entering step 626. If yes, the processor 200 proceeds to step 720 in which it selects the base station in the roaming table 320 which has the next highest priority as previously determined in step 700. Thereafter, the processor 200 returns to step 704 and the above-described process is repeated for the newly selected base station 154, 156. If, however, no more base stations exist as determined in step 718, the processor 200 proceeds to step 722 in which the processor 200 concludes that no better base station is available. Accordingly, back in step 628 of FIG. 15 the processor 200 concludes that no better base station is available and proceeds to step 650.

Referring back to step 710, as noted above it is possible that the selected base station 154, 156 may be slightly ahead in the hopping sequence as compared to the mobile terminal 166. As a result, the selected base station may not receive the probe packet or transmit a beacon packet on the same channel as the mobile terminal 166 is on at a given time. Accordingly, the processor 200 in such case will not receive a probe response packet or beacon within the predetermined time in step 710. In this event, the processor 200 initiates a routine whereby the mobile terminal advances a predetermined number of subsequent channels in the hopping sequence in an effort to "catch up" with the base station 154, 156. For example, in the present embodiment the processor 200 sequences through up to the next three channels in an effort to lock onto the base station.

More specifically, if in step 710 a probe response packet or beacon is not received within the predetermined period of time the processor 200 proceeds to step 730 in which the value of the counter variable x is incremented by one. Next, the processor 200 proceeds to step 732 in which it determines whether the counter variable x is greater than three. If not, the processor 200 proceeds to step 734 in which it increments by one the expected channel number of the selected base station 154, 156 as utilized in step 708. For example, if previously the selected base station 154, 156 was expected to be at channel $f_{2,B,34}$ in the hopping sequence, the processor 200 immediately advances the FH sequence modulator 220 by one so as to be at channel $f_{2,B,35}$. Following step 734, the processor returns to step 708 and attempts to lock on in the hopping sequence of the selected base station in the same manner described above.

If in step 710 the mobile terminal 166 still does not receive a probe response packet or beacon packet, the processor 200 again advances the position of the mobile terminal in the hopping sequence by one channel in step 730. Thereafter, the processor again tries to lock on to the selected base station. If, after three additional attempts to lock on via steps 730–734 the mobile terminal 166 is still unsuccessful, the processor 200 in step 732 will proceed directly to step 718. In step 718 the processor 200 determines whether other base stations are available in the reduced roaming table 320 with which to attempt to lock on as previously described. In the exemplary embodiment, the processor 200 is designed to advance through the next three channels in the sequence. Still, it will be appreciated that another number could be used. Furthermore, the mobile terminal 166 can also account for the possibility that due to clock delays, slightly different clock rates, etc., the selected base station 154, 156 may be slightly behind the mobile terminal 166 in the hopping sequence. For example, rather than incrementing the expected channel by one in step 734, step 734 may instead consist of decrementing the expected channel by one for up to three times. In other words, the mobile terminal 166 moves back through as many as three channels in the hopping sequence in relation to the originally expected channel as determined in step 704. Thus, another embodiment of the invention involves a combination of incrementing and decrementing in step 734 so as to account for possible misalignment between the mobile terminal and base station hopping sequences in either direction.

It is noted that the various device processing performed as described herein by the various processors is performed at a rate which is substantially instantaneous for the most part compared to the dwell time of each channel in the hopping sequences. As a result, despite that fact that a mobile terminal may attempt to lock on to several different base stations in the reduced roaming table and may advance through several channels in an effort to "catch-up", on the average the mobile terminal will be able to lock-on to a new base station more quickly than if a conventional active or passive scanning technique were utilized.

Figure 18:
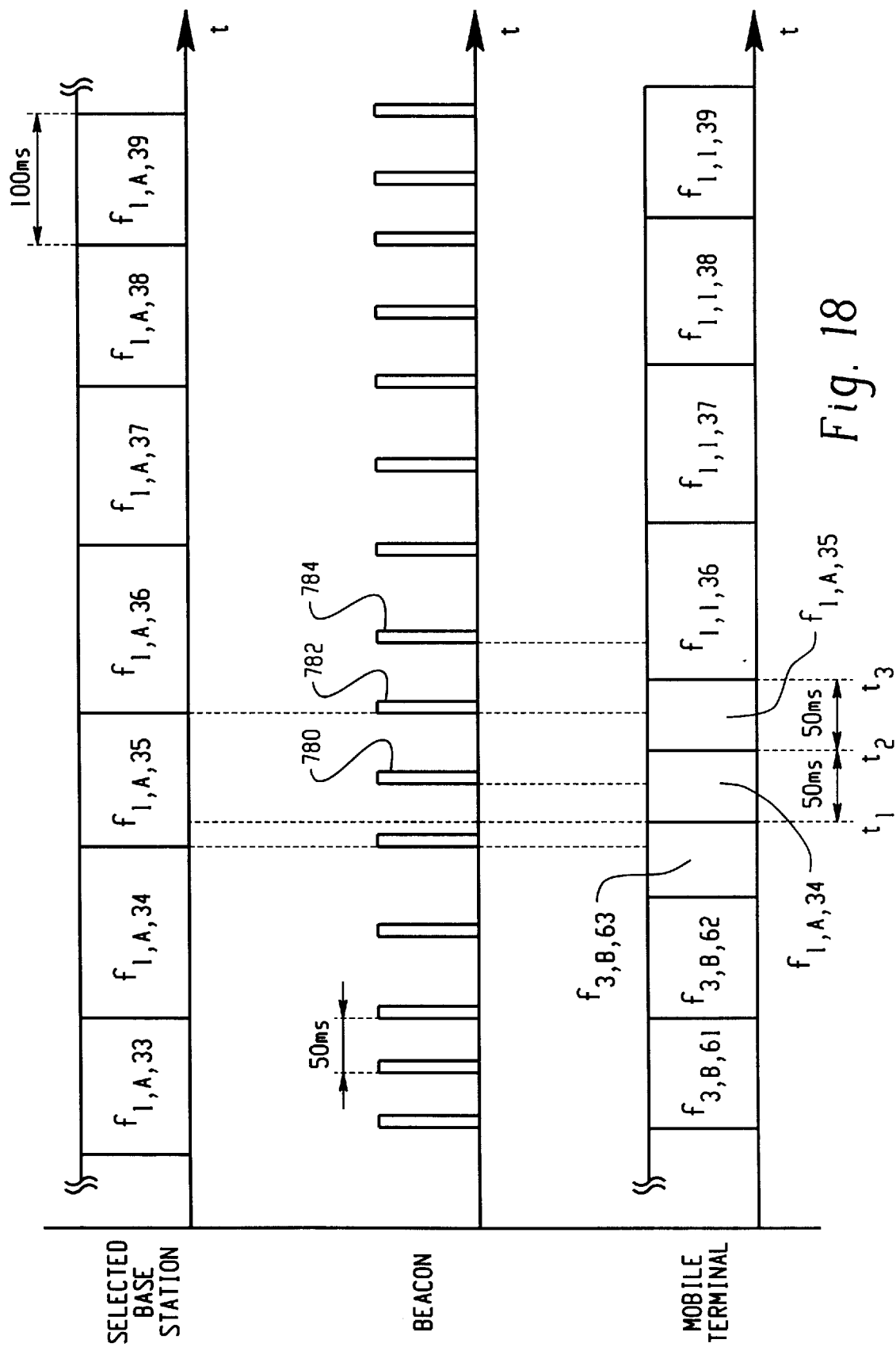
FIG. 18 is a timing diagram illustrating a manner in which a mobile terminal locks-on to a hopping sequence of a new base station using a passive-based fast scan routine in accordance with the present invention.

Briefly referring to FIG. 18, an exemplary timing diagram is shown illustrating how a mobile terminal 166 locks onto a selected base station 154, 156 using a passive scanning mode. As set forth above, the channel dwell time in the system is 100 msec, and suppose the selected base station 154, 156 is programmed to transmit a beacon packet at 50 msec intervals starting at the beginning of the first hop as shown in FIG. 18. Prior to time t1 the mobile terminal 166 is registered to another base station 154, 156 and is utilizing the hopping sequence $f_{3,B}$. At the same time, the selected base station is utilizing the hopping sequence $f_{1,A}$. Beginning at time t1 the mobile terminal 166 begins the priority fast scan of step 626 in FIG. 16. Supposing that the sequence information 302 and time stamp information 304 for the selected base station in the reduced roaming table 320 indicated that the base station was currently at channel number 34 in sequence $f_{1,A}$ (as determined in step 704), the mobile terminal 166 at time t1 changes to the hopping sequence $f_{1,A}$ and jumps immediately to channel $f_{1,A,34}$ in the sequence.

The mobile terminal 166 then waits 50 msec to determine whether it receives a beacon packet from the selected base station. While the selected base station 154, 156 does in fact transmit a beacon packet 780 during such time, it just so happens that the base station is advanced slightly in the hopping sequence relative to the mobile terminal. Thus, the beacon packet is transmitted on channel $f_{1,A,35}$ whereas the mobile terminal 166 is looking to receive a beacon packet on channel $f_{1,A,34}$. Consequently, the beacon packet 780 is not received by the mobile terminal. Accordingly, at time t2 (50 msec after time t1) the mobile terminal 166 proceeds through steps 730–734 and jumps ahead one channel to channel $f_{1,A,35}$ and waits to receive a beacon packet (steps 708, 710). Again the selected base station 154, 156 transmits a beacon packet 782 but this time the beacon packet is transmitted at the beginning of channel $f_{1,A,36}$. As a result, the beacon packet again is not received by the mobile terminal 166. Therefore, at time t3 (50 msec after time t2) the mobile terminal 166 proceeds through steps 730–734 and jumps ahead another one channel to channel $f_{1,A,36}$ and waits to receive a beacon packet (steps 708, 710). Again the selected base station 154, 156 transmits a beacon packet 784, but this time the beacon packet is transmitted in the middle of channel $f_{1,A,36}$. As a result, the beacon packet 784 is received by the mobile terminal 166. The mobile terminal can then proceed to lock on in response to the beacon packet using conventional techniques (step 712). As shown in FIG. 18, the mobile terminal is able to lock onto the hopping sequence of the selected base station very quickly based on the information provided in the reduced roaming table 320.

Figure 19:
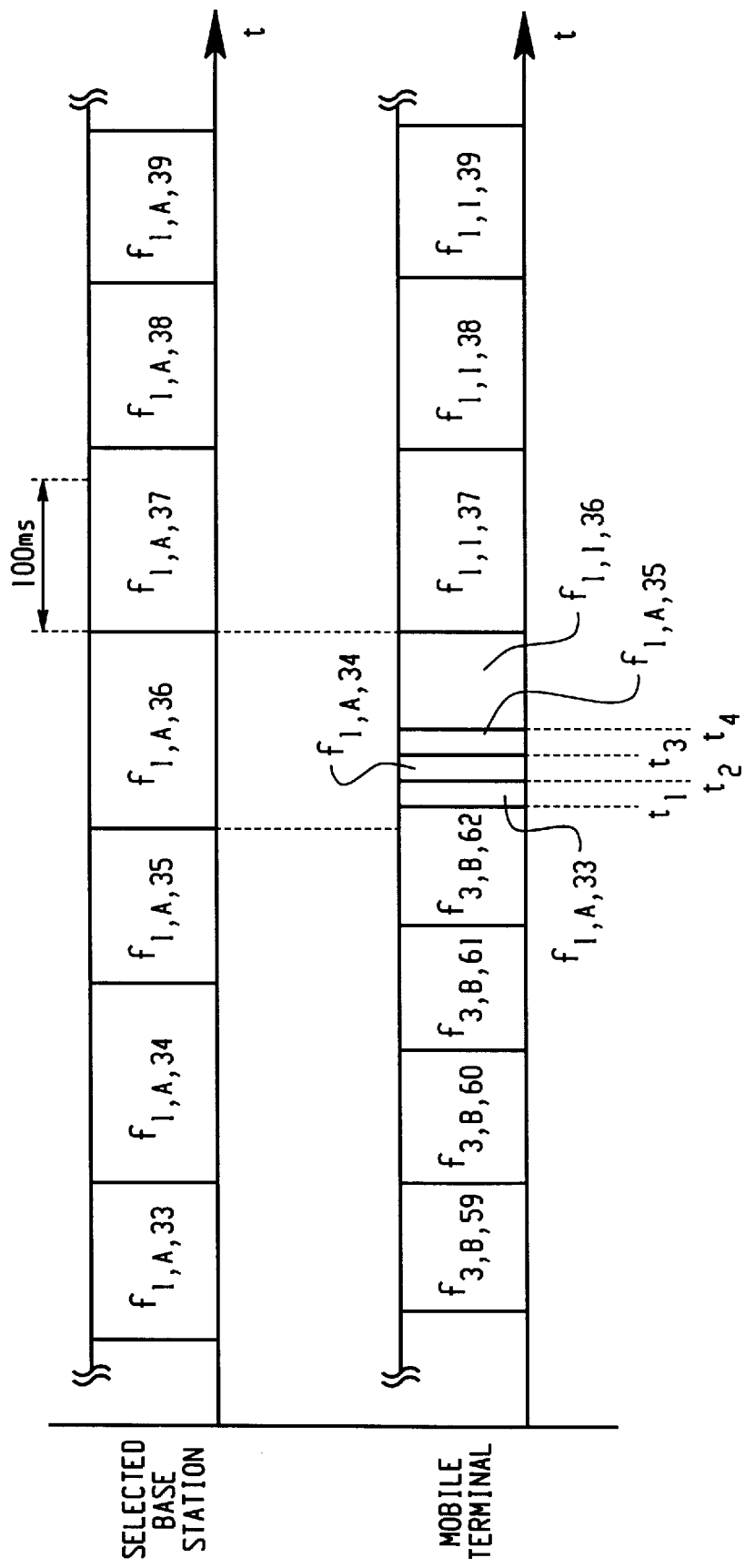
FIG. 19 is a timing diagram illustrating a manner in which a mobile terminal locks-on to a hopping sequence of a new base station using an active-based fast scan routine in accordance with the present invention.

Referring to FIG. 19, an exemplary timing diagram is shown illustrating how a mobile terminal 166 locks onto a selected base station 154, 156 using an active scanning mode. Using the same example, the channel dwell time in the system is 100 msec. Prior to time t1 the mobile terminal 166 is registered to another base station 154, 156 and is utilizing the hopping sequence $f_{3,B}$. At the same time, the selected base station is utilizing the hopping sequence $f_{1,A}$. Beginning at time t1 the mobile terminal 166 begins the priority fast scan of step 626 in FIG. 16. Supposing that the sequence information 302 and time stamp information 304 for the respective selected base station in the reduced roaming table 320 indicated that the base station was currently at channel number 33 in sequence $f_{1,A}$ (as determined in step 704), the mobile terminal 166 at time t1 changes to the hopping sequence $f_{1,A}$ and jumps immediately to channel $f_{1,A,33}$ in the sequence.

The mobile terminal 166 then proceeds to transmit a probe packet on channel $f_{1,A,33}$. Again, however, it happens that the selected base station is slightly advanced in the hopping sequence relative to the mobile terminal. As a result, the selected base station does not receive the probe packet as it is on channel $f_{1,A,36}$ at time t1. Accordingly, at time t2 (6 msec after time t1) the mobile terminal 166 proceeds through steps 730–734 and jumps ahead one channel to channel $f_{1,A,34}$, transmits a probe packet, and waits to receive a probe response packet (steps 708, 710). At time t2 the selected base station 154, 156 continues to be on channel $f_{1,A,36}$. Therefore, the probe packet is not received. At time t3 (6 msec after time t2), the mobile terminal 166 proceeds through steps 730–734 and jumps ahead another one channel to channel $f_{1,A,35}$ and again transmits a probe packet (steps 708, 710). The selected base station 154, 156 continues to remain on channel $f_{1,A,36}$, however, and therefore still does not receive the probe packet. Finally, at time t4 (6 msec after t3) the mobile terminal 166 jumps ahead one more channel to channel $f_{1,A,36}$ and transmits a probe packet. This time the probe packet is transmitted on the same channel which the selected base station is on. As a result, the probe packet is received by the base station and a probe response packet can then be transmitted to the mobile terminal from the base station in response thereto. As shown in FIG. 19, the mobile terminal again is able to lock onto the hopping sequence of the selected base station very quickly based on the information provided in the reduced roaming table 320.

Turning back to FIG. 17, an exemplary prioritization scheme for use in prioritizing the base stations in the reduced roaming table 320 in step 700 of FIG. 16 is shown. Nevertheless, it will be appreciated that other prioritization schemes could also be used. Beginning in step 802, the processor 200 in the mobile terminal assigns a value to each base station entry in the reduced roaming table 320 based on the value of the last scanned timer 324. The higher the value of the last scanned timer 324, the higher the value assigned.

For example, the following table can be used for assigning values to each base station in the reduced roaming table 320:

| Last Scan Timer Value (in seconds) | Assigned Value. |
|---|---|
| 0.00 to 0.49 | 1 |
| 0.50 to 0.99 | 2 |
| 1.00 to 1.49 | 3 |
| 1.50 to 1.99 | 5 |
| 2.00 to 2.99 | 8 |
| 3.00 to 3.99 | 10 |
| 4.00 or greater | 15 |

Following step 802, the processor 200 proceeds to step 804 in which it calculates a priority weight for each of the base stations included in the roaming table 320 based on the values assigned in step 802 and the value of the corresponding roam counter 312. For example, the priority weight of each base station is calculated using the equation:

priority weight=(assigned value)×(roam counter value).

Next, in step 806 the processor 200 determines whether any base stations included in the reduced roaming table 320 have not been scanned (i.e., attempted to be locked onto) in the last ten occurrences of the priority fast scan (step 626 in FIG. 15). If yes, any such base stations are assigned "top priority" status in step 808 following step 806. Thereafter, the processor proceeds to step 810. Similarly, if no base stations meet the aforementioned criteria in step 806, the processor 200 proceeds to step 810.

In step 810 the processor 200 prioritizes the base stations in order as follows. Those base stations assigned "top priority" status in step 808 are given higher priority over any other base stations regardless of their priority weights calculated in step 804. In the event there is more than one base station assigned "top priority", such base stations are prioritized in the order of those having the highest priority weights. In the event there is a tie among priority weights, priority is given to the base station having the highest roam counter value.

Among the base stations not assigned "top priority", these base stations are ordered by way of the base station with the highest priority weight. In the event of a tie between base stations, priority is given to the base station having the highest roam counter value. Following step 810, the processor 200 returns to step 702 in FIG. 16.

According to another prioritization scheme in which passive scanning is used during the priority fast scan, the processor 200 takes into account the expected timing of the beacon packets from the base stations 154, 156. For example, in addition to the priority weighting and "top priority" status discussed in relation to FIG. 17, the processor 200 may use the information in the optional beacon interval field 306 for each base station. Among base stations having the same or similar priority, the processor 200 can choose to select first the base station which is expected to be the first in time to transmit a beacon packet (as determined from the beacon interval fields 306). This way additional time can be saved due to the increased probability of locking onto a base station more quickly.

Alternatively, in another prioritization scheme using either active or passive scanning, the processor 200 is programmed to take into account the expected timing of the test patterns from the selected base stations 154, 156. For example, among base stations having the same or similar priority as determined in connection with FIG. 17, the processor 200 may look to which base station is expected to be the first in time to transmit a test pattern packet. The processor 200 can easily compute such information based on the contents of the optional test interval fields 308. The processor 200 is programmed to select such base station first so as to reduce the time associated with waiting to receive a test packet from a selected base station.

Although the invention has been described primarily with reference to a frequency hopping system it could also be readily used with any system in which a mobile terminal or device must "lock-on" to different communication parameters used by different base stations. For example, it may be the case that alternate base stations communicate using different modulation schemes such as BPSK or QPSK and/or using different PN coding sequences in the case of a direct sequence spreading system. In such case, the roaming tables 296 and 320 each have a field which stores modulation scheme information which can be passed along to a mobile terminal in the same manner described above in relation to passing information regarding the particular hopping sequences which are utilized. Prior to roaming from one cell to another, a mobile terminal may evaluate the possible modulation schemes and determine whether it is preferable to communicate using one modulation scheme over another. Based on the information in the roaming table 320 the mobile terminal attempts first to register with the base station using the preferred modulation scheme. In this manner, a more efficient and desirable registration scheme is provided.

Although the invention has been shown and described with respect to certain preferred embodiments, it is obvious that equivalents and modifications will occur to others skilled in the art upon the reading and understanding of the specification. For example, although the host computer 158 is used in the exemplary embodiment to maintain the universal clock time and base station registration information, another device (i.e., a "host device") on the system backbone 152 could be utilized to perform the same function. The host computer 158 is chosen as a matter of convenience, although any other predetermined device (such as a dedicated processor) may be used.

The present invention includes all such equivalents and modifications, and is limited only by the scope of the following claims.

What is claimed is:

1. A mobile device for use in a cellular communication system, said cellular communication system comprising a backbone and a plurality of base stations coupled thereto, said mobile device capable of communicating with said backbone via one of said plurality of base stations to which the mobile device is currently registered, said mobile device comprising:

wireless communication means for communicating information between said mobile device and said backbone;

means for receiving a universal clock time based on a universal time keeper within the system hop sequence information related to other of said base stations from said one base station;

means for storing said universal clock time and said hop sequence information;

means for computing a communication channel at which at least one of said other base stations is expected to be, based on said universal clock time and said hop sequence information; and means for jumping directly to the communication channel.

2. The mobile device of claim 1, wherein said mobile device is a mobile terminal having a bar code reader.

3. The mobile device of claim 1, wherein said mobile device further comprises:

means for determining whether said at least one other base station is communicating on said communication channel by listening for beacons on said communication channel.

4. The mobile device of claim 3, further comprising:

means for moving quickly through at least one other communication channel at which said one other base station is expected to be in the event said mobile device does not receive a beacon.

5. The mobile device of claim 1, wherein said mobile device further comprises:

means for determining whether said at least one other base station is communicating on said communication channel by transmitting a probe packet on said communication channel and waiting a predetermined period of time to receive a response.

6. The mobile device of claim 5, further comprising:

means for moving quickly through at least one other communication channel at which said one other base station is expected to be in the event said mobile device does not receive a response.

* * * * *